(12) United States Patent
Agrawal et al.

(10) Patent No.: US 6,906,842 B2
(45) Date of Patent: Jun. 14, 2005

(54) ELECTROCHROMIC DEVICES

(75) Inventors: Anoop Agrawal, Tucson, AZ (US); John P. Cronin, Tucson, AZ (US); Todd J. Gudgel, Tucson, AZ (US); Stephan G. Hansen, Rocklin, CA (US); Raymond L. Zhang, Tucson, AZ (US); Torsten Holdmann, Mainz (DE); Andrew R. Ingle, San Jose, CA (US); Juan Carlos L. Tonazzi, Tucson, AZ (US); Yelena Feinstein, Tucson, AZ (US)

(73) Assignees: Schott North America, Inc., Elmsford, NY (US); Magna Donnelly Corporation, Holland, MI (US)

( * ) Notice: Subject to any disclaimer, the term of this patent is extended or adjusted under 35 U.S.C. 154(b) by 0 days.

(21) Appl. No.: 10/276,409

(22) PCT Filed: May 24, 2001

(86) PCT No.: PCT/US01/16746

§ 371 (c)(1),
(2), (4) Date: Nov. 13, 2002

(87) PCT Pub. No.: WO01/90809

PCT Pub. Date: Nov. 29, 2001

(65) Prior Publication Data

US 2003/0227664 A1 Dec. 11, 2003

Related U.S. Application Data

(60) Provisional application No. 60/206,828, filed on May 24, 2000.

(51) Int. Cl.[7] ............................. G02F 1/15; G02F 1/153
(52) U.S. Cl. ....................... 359/265; 359/266; 359/267; 359/269
(58) Field of Search ................................. 359/265, 266, 359/267–271

(56) References Cited

U.S. PATENT DOCUMENTS

| | | | |
|---|---|---|---|
| 3,628,022 A | 12/1971 | Schulte, Jr. .................. | 250/199 |
| 4,245,883 A | 1/1981 | Johnson et al. ........... | 350/96.14 |
| 4,843,427 A | 6/1989 | Ibuchi ......................... | 355/218 |

(Continued)

FOREIGN PATENT DOCUMENTS

| | | |
|---|---|---|
| WO | WO 9722906 | 6/1997 |
| WO | WO 9808137 | 2/1998 |
| WO | WO 9908153 | 2/1999 |
| WO | WO 9945169 | 9/1999 |
| WO | WO 9955023 | 10/1999 |
| WO | WO 0184230 | 11/2001 |

OTHER PUBLICATIONS

Crandall, et al, "Electronic Transport in Amorphous $H_2WO_3$", *Phys. Rev. Letts.* 39, 232 (1977).
Cronin, et al, *Solar Energy Mats. And Solar Cells* 29, 271 (1993).
Nabavi, *Materials & Science Engineering B3*, 203 (1989).
O'Brien, et al, "An Electrochromic Variable Optical Attenuator (ECVOA)" in *Conf. On Optical Fiber Commun., Technical Digest Series* (1989).

(Continued)

*Primary Examiner*—Timothy Thompson
(74) *Attorney, Agent, or Firm*—David M. Quinlan, P.C.

(57) ABSTRACT

The invention includes many applications for electrochromic devices that require neutral colors and patterned electrodes. It uses novel materials, ways of making the materials, device configurations and applications. In one aspect, the device also includes electrical leads (115,116), transparent conductor layers (135,136), patterned EC layers (143,144), an etch line (99) and a substrate (125).

14 Claims, 11 Drawing Sheets

U.S. PATENT DOCUMENTS

| | | | | |
|---|---|---|---|---|
| 4,902,110 A | * | 2/1990 | Green | 359/275 |
| 5,252,354 A | | 10/1993 | Cronin et al. | 427/58 |
| 5,277,986 A | | 1/1994 | Cronin et al. | 428/432 |
| 5,321,544 A | * | 6/1994 | Parkhe et al. | 359/273 |
| 5,457,218 A | | 10/1995 | Cronin et al. | 556/44 |
| 5,481,395 A | * | 1/1996 | Byker | 359/272 |
| 5,724,187 A | | 3/1998 | Varaprasad et al. | 359/608 |
| 5,729,379 A | | 3/1998 | Allemand et al. | 359/270 |
| 5,801,542 A | | 9/1998 | Kajiwara et al. | 324/755 |
| 5,903,382 A | | 5/1999 | Tench et al. | 359/265 |
| 5,910,854 A | | 6/1999 | Varaprasad et al. | 359/273 |
| 6,039,390 A | | 3/2000 | Agrawal et al. | 296/211 |
| 6,045,724 A | | 4/2000 | Varaprasad et al. | 252/583 |
| 6,178,034 B1 | | 1/2001 | Allemand et al. | 359/265 |
| 6,266,177 B1 | | 7/2001 | Allemand et al. | 259/265 |
| 6,317,248 B1 | | 11/2001 | Agrawal et al. | 359/25 |
| 6,631,022 B1 | * | 10/2003 | Kihira et al. | 359/265 |
| 2002/0041443 A1 | * | 4/2002 | Varaprasad et al. | 359/603 |

OTHER PUBLICATIONS

Rogers, et al, "Using an Elastomeric Mask for Sub–100nm Photolithography in the Optical Near Field", *Appl. Phys. Lett.* 70,2658 (1997).

Rose, et al, "A Microwave Shutter using Conductive Polymers", *Synthetic Metals 85*, 1439 (1997).

Whitesides and Xia, "Replica Molding: Complex Optics at Lower Costs", *Photonics Spectra*, p. 90, (Jan. 1997).

Yamada, et al, "Large Area Chromogenics: Material and Devices for Transmittance Control," Lampert CM and CG Grandqvist eds., *The International Society of Optical Engineering (SPIE)*, p. 246.

International Search Report in International Appln. PCT/US01/16746, Nov. 6, 2001.

International Preliminary Examination Report in International Appln. No. PCT/US01/16746, Jul. 25, 2002.

* cited by examiner

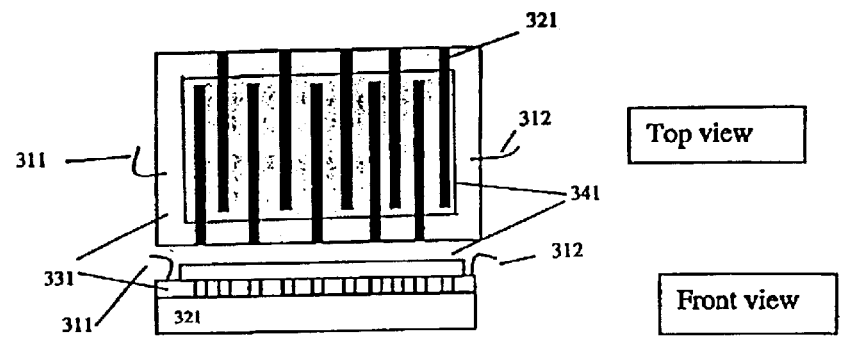
Figure 16
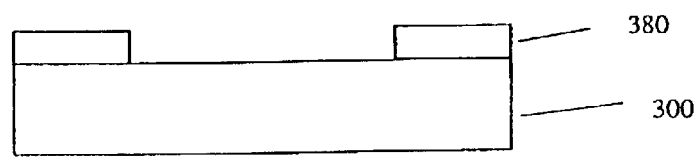
Figure 17
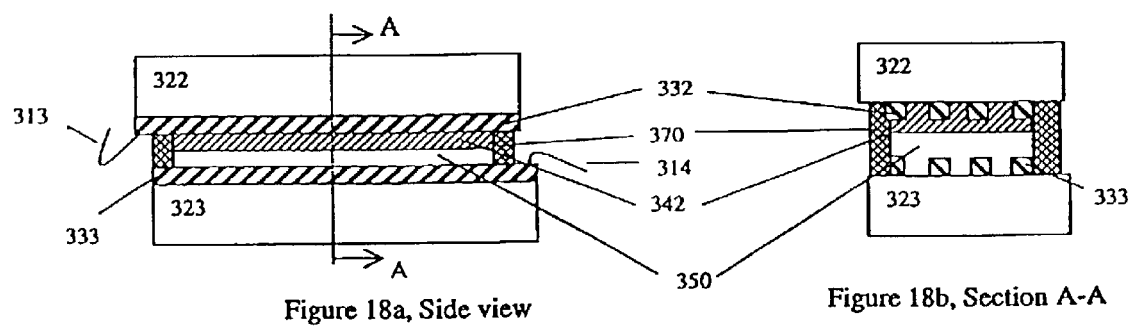
Figure 18a, Side view    Figure 18b, Section A-A

Figure 19a
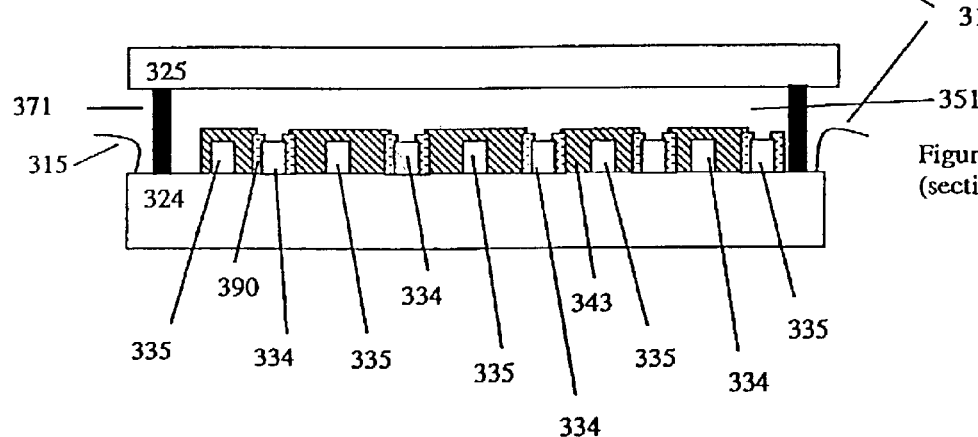
Figure 19b, (section B-B)

ELECTROCHROMIC DEVICES

CROSS-REFERENCE TO RELATED APPLICATIONS

This application is the National Stage of International Application No. PCT/US01/16746 filed May 24, 2001, which claims the benefit of U.S. Provisional Application No. 60/206,828, filed May 24, 2000.

FIELD OF THE INVENTION

This invention relates to chromogenic technology and, more particularly, to the fabrication of chromogenic devices for applications requiring variable electromagnetic radiation (UV, visible, infra-red, microwave, radiowaves etc.) transmission or reflection at the discretion of the user.

BACKGROUND OF THE INVENTION

Optical wavelengths are typically referred to as radiation encompassing UV, visible and infra-red wavelengths of about 200 nm to 25,000 nm. Solar radiation on earth's surface is generally between 290 nm and 2500 nm. Chromogenic devices for optical attenuation are of several kinds, such as liquid crystal devices, suspended particle devices, user controllable photochromic devices and electrochromic (EC) devices (e.g., see WO 98/08137 for a description of such devices and the various kinds of electrochromic devices the complete disclosure of which is incorporated by reference herein). All further discussions will be limited to the EC devices, although anyone familiar with art can extend the principles of the disclosure here to the other chromogenic devices as well. EC devices have several advantages, wide spectral response, wider temperature capability, generally non-polarizing attenuation, angle independent contrast, possibility of larger size scale-up, etc. The applications described below are discrete, however, many of the elements and concepts described here for one application may apply to the others as well. In addition, many EC materials may change electrical and magnetic properties, and this change can be used to change transmission of non-optical radiation such as radio and microwaves.

FIGS. 1a and 1b show examples of typical electrochromic device fabricated using two substrates, however many other EC devices can be fabricated, some of them may only use one substrate.

FIG. 1a shows two substrates 120 and 121. These have conductive coatings 130 and 131, respectively. An EC layer 140 is deposited on 131. The two substrates are connected using an electrolyte 150. The edges of the device are sealed using a sealant 170 to protect the inside of the device, and also to contain the electrolytic components. Power is applied through the connectors 110 and 111 to change the optical density. A DC voltage, typically less than 5 volts is applied across the connectors to color the device. The ions are either inserted or expelled from the EC layer that causes a change in color. A corresponding reaction takes place at the interface of the electrolyte and the other electrode involving the redox species which is incorporated in the electrolyte.

When the voltage is removed or reversed, the reactions also reverse.

FIG. 1b shows another type of EC device which has a counterelectrode (ion storage layer) 160 deposited on a conductive coating 132 which is pre-deposited on a substrate 123. The other substrate 122 is coated with a conductive coating 133 and then with an EC layer 141. They are connected together by an electrolyte 151 and sealed at the edges by a sealant 171. Power is applied via the connectors 112 and 113. In the bleached state the ions such as protons, lithium and sodium reside in the counter-electrode. Under an appropriate voltage, these ions are reversibly extracted from the counterelectrode, travel through the electrolyte and are then inserted in the EC layer. This causes a change in transmission, i.e., coloration in the EC layer assuming that the EC layer is cathodically electrochromic. There may also be a simultaneous change in the optical transmission of the counter electrode by expulsion of ions if it is anodically electrochromic.

Transparent means substrates which transmit part of the electromagnetic radiation which is being modulated by the device. Examples of transmissive substrates are glass, plastics, silicon, etc. Some examples of transparent electrical conductors are coatings based on thin metal layers such as gold, palladium, rhodium, alloys and doped oxides such as tin oxide, indium oxide, zinc oxide and antimony oxide, and some of the preferred dopants in each of these oxides are fluorine, tin oxide, aluminum oxide and tin oxide respectively. The dopants may be present up to 25% concentrations (measured as atomic ratio of dopant to host cations). The thickness of the oxide coatings is typically between 10 nm to 10,000 nm. For metallic coatings the upper limit is around 30–50 nm before they become optically opaque. There may be other layers below the transparent conductors, such as anti-iridescent layers, dielectrics, other metals, etc. Examples of EC materials are tungsten oxide, molybdenum oxide, iridium oxide, nickel oxide, polythiophene and polyaniline. Typical thickness of EC layer is in the range of 10 nm to about a 1000 nm. The electrochromic cell is assembled with the coatings facing inwards. A predetermined distance separates the two substrates. This distance or the gap is filled with an electrolyte which could be a liquid or a solid. The edge of the device is sealed for example with an organic sealant (e.g., curable epoxy resin) or an inorganic sealant (e.g., solder glass) so that the interior of the device is protected from the environment and the electrolyte (if liquid) does not leak out. The electrolyte thickness or the gap between the two substrates can be controlled by the thickness of the solid electrolyte, spacers in the electrolyte and/or the seals. Typical gaps are in the range of 5 microns to 5000 microns, where gaps between 10 and 1000 microns are preferred.

The electrolyte in an electrochromic device in FIG. 1a will have at least one polar solvent, one dissociable salt and a redox promoter in the electrolyte. Sometimes the salt and the redox promoter may be combined into one such material as lithium iodide, viologen salt, etc. Examples of salts are $NaCF_3SO_3$, $NH_4BF_4$, $LiClO_4$, $LiAsF_6$, $LiBF4$, $LiCF_3SO_3$, $Li\ N\ (CF_3SO_3)_2$. Examples of redox materials are LiI, Iodine, viologen salts, phenothiazine, metallocenes such as ferrocene and its derivatives. Examples of solvents are tetraglyme, propylene carbonate, ethylene carbonate, gamma-butyrolactone, sulfolane and its derivatives, acetonitrile and other nitrile solvents. Other additives such as UV stabilizers, fillers, opacifiers and viscosity modifiers may be used. Examples of UV stabilizers are benzophenones, benzotriazoles, metal complexes and combinations. Some commercial examples are Uvinul 3035, Uvinul 3000 from BASF (Mount Olive, N.J.), the same from Ciba Specialty Chemicals (Brewster, N.Y.) are Tinuvin 234 and from Cytec, West Paterson, N.J., Cyasorb UV1164. Some viscosity modifiers are polymers and copolymers of polypropylene oxide, polyethylene oxide, acrylics such as polymethylmethacrylate, and polyurethanes, etc. One may even have monomeric additives and catalysts that will polymerize in-situ to yield a solid polymer or a higher viscosity electrolyte. Some of these polymerize by addition polymerization such as acrylic or acrylate terminated groups with free radical or ionic initiators, or polycondensation such as isocyanates and hydroxy terminated groups with appropriate catalysts such as tin octoate, etc. Examples of components in such devices can be found in, e.g., U.S. Pat. Nos. 5,910,854 and 6,045,724.

In FIG. 1b the redox promoter in the electrolyte is not necessary as one of the EC or the ion-storage layer is intercalated with ions (typically protons, lithium, sodium, potassium, etc.) which are shuttled reversibly between the EC layer and the ion-storage layer. For an EC layer that colors upon reduction, these ions are inserted in this electrode for coloration and extracted for bleach. For anodic coloring EC layer the coloration occurs by expulsion of the ions and bleach by ion-intercalation. Also, in an EC device the EC layer could be a cathodically coloring layer such as tungsten oxide and molybdenum oxide and the ion-storage layer could also be an EC layer that colors anodically, such as polyaniline and nickel oxide. Also due to the insertion of ions in an electrode, refractive index changes are introduced, and these changes could also be used for changing the light propagation direction, hence switching.

In FIGS. 1a and 1b the two substrates are offset to facilitate an electrical connection to the conductive layers. One may even extended the conductive strip from the transparent conductor to the edge or the back side of substrate and then attach the connecting electrical wires, e.g., by soldering. The extension of conductive path on to the edges, etc., may be done using conductive solders, silver frits and conductive tapes.

An electrochromic device may be colored by varying the electric potential applied to one substrate relative to the second. Tungsten oxide exhibits broad absorption almost in the entire range of solar radiation. Electrochromic devices can also be formed on single substrates by sequentially depositing an electronic (or electrical) conductor coating (such as tin doped indium oxide (ITO), fluorine or antimony doped tin oxide, gold, rhodium), an ion-intercalative layer (such as tungsten oxide, molybdenum oxide, niobium oxide, titanium oxide), ion transport layer (such as tantalum oxide (proton conductor), lithium titanate. (lithium conductor), another ion intercalative layer (such as those described above and iridium oxide, nickel oxide, vanadium oxide, polyaniline) and finally another conductor coating (examples described above). At least one of these conductors is transparent and at least one of the ion-intercalative layer is electrochromic, i.e., changes its color reversibly upon ion insertion and ion extraction. All the materials described above may be alloyed or combined with other materials as described in the art. Further, for purposes of this invention where non optical electromagnetic spectrum has to be varied, the electrochromic property of a layer in any of the above devices will be extended in definition to include where the electrical conductivity of the EC layer will change reversibly upon ion insertion and ion extraction. Another kind of EC device will be included in this discussion where a metal (copper, bismuth, etc.) is reversibly deposited due to the electrochemical action on one of the electrodes, an example of this is in U.S. Pat. No. 5,903,382, which is incorporated by reference herein. In this invention the term switches, modulator and attenuators be will be used interchangeably as in a broader sense all of these imply where the intensity of the signal which passes through these is changed.

SUMMARY OF THE INVENTION

In accordance with the principles of the present invention, the variable light transmissivity characteristics of electro chromic devices are employed to provide special effects in two areas:

1) Those applications where an EC device is required, and would have a neutral color during the range of coloration. This invention will disclose dopants which can be used in tungsten oxide to yield EC layers which color to a neutral color during ion insertion and extraction. Primarily the neutral color is required between 400 and 750 nm for visible light applications. Some of these are viewing devices need variable neutral density filters: including gun sights, viewfinders, microscopes photographic filters and laboratory optical equipment and projection.

2) Those applications where patterned EC layers can be used as they will demonstrate one of optical and non-optical effects (such as changes in its electrical properties). We will also disclose reversible attenuators for microwaves and radio-waves which are based on electrical property changes in the device. These patterns can find use in several applications including optical and non-optical communications such as in waveguides. Examples of other applications of patterns are optical or electronic camouflage, where moiré patterns of any type of electromagnetic radiation could be created actively without mechanical movement of substrates.

BRIEF DESCRIPTION OF THE DRAWINGS

FIG. 16 shows a thermochromic device to modulate microwaves.

FIG. 17 shows an electrochromic device to modulate microwaves.

FIG. 18a shows a side view of an EC device to modulate microwaves.

FIG. 18b shows front view section of an EC device to modulate microwaves.

FIG. 19a shows the top view of an EC device to attenuate microwaves.

FIG. 19b shows front view section of an EC device to modulate microwaves through section B—B in FIG. 19a.

A complete understanding of the different embodiments of the invention will be understood from the following detailed description taken in conjunction with these drawings.

DETAILED DESCRIPTION OF PREFERRED EMBODIMENTS

The present invention is capable of being embodied in many different applications that take advantage of the properties of chromogenic devices utilizing the invention's unique properties to provide the desired special effects. Several such applications are discussed below.

Application Area—Sights

Electrochromic devices may be included in such sight applications as reticules, graticules, filters, stops and lenses which are used in optical devices such as microscopes, telescopes, binoculars, gun sights, periscopes,—camera viewfinders, endoscopic viewfinders, theodolites, etc. where either of the two characteristics are required:

1. To control the light transmission or reflection through the instrument
2. To display reversible (or erasable) information such as magnification, scales, focus, comparators, etc.

Electrochromic elements can be introduced in the above-described optical instruments as filters, reticules, gratings, lenses, buffers and stops, etc. Electrochromic elements are particularly well suited for displaying information with high contrast and no angle dependence. Further, one may combine several such elements in one instrument, e.g., one element may provide contrast control, another may display information, be an electronic aperture, lens, diffraction grating, etc.

Figure 1A:
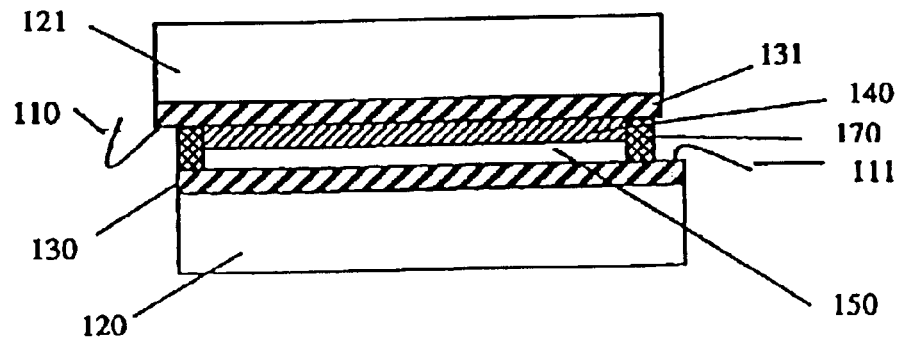
FIG. 1a shows an EC device without ion-storage electrode.
Figure 1B:
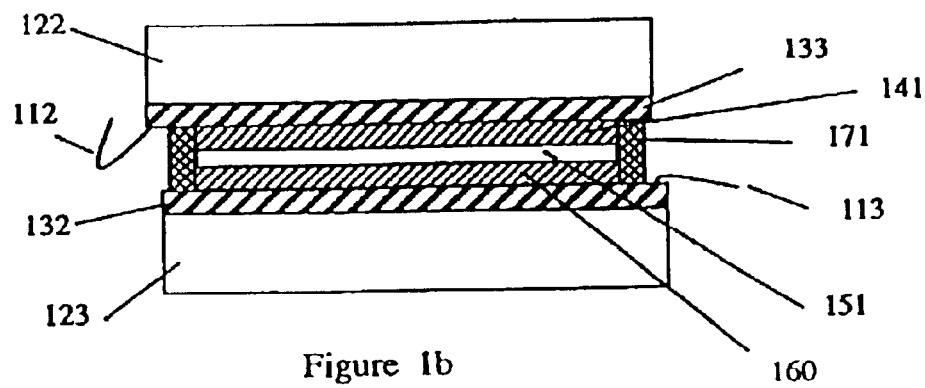
FIG. 1b shows an EC device with an ion-storage electrode.
Figure 2:
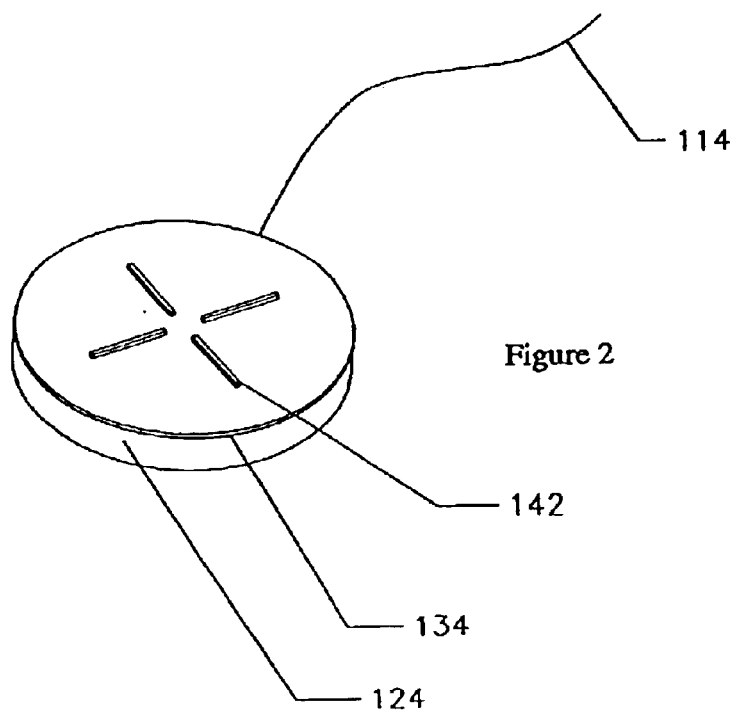
FIG. 2 shows a patterned electrode which can be incorporated in the EC device.

FIG. 2 shows a patterned EC coated substrate to be incorporated in an EC device for a gun sight. The tungsten oxide coating has been etched to form a crosshair pattern. The figure shows a substrate 124, with a transparent conductor layer 134. The EC layer 142 is deposited in a pattern form on the conductive layer 134. The electrical lead 114 is connected to the layer 134 to apply power. The device can be made following the scheme described in FIG. 1a or FIG. 1b. The patterned substrate is used as the EC layer. The pattern appears in the sight when the device is colored. Whenever the pattern is not needed, the coloration is removed by applying bleach potential (which may be by shorting of the circuit, removing power, reversing the polarity, changing the voltage, etc).

Figure 3:
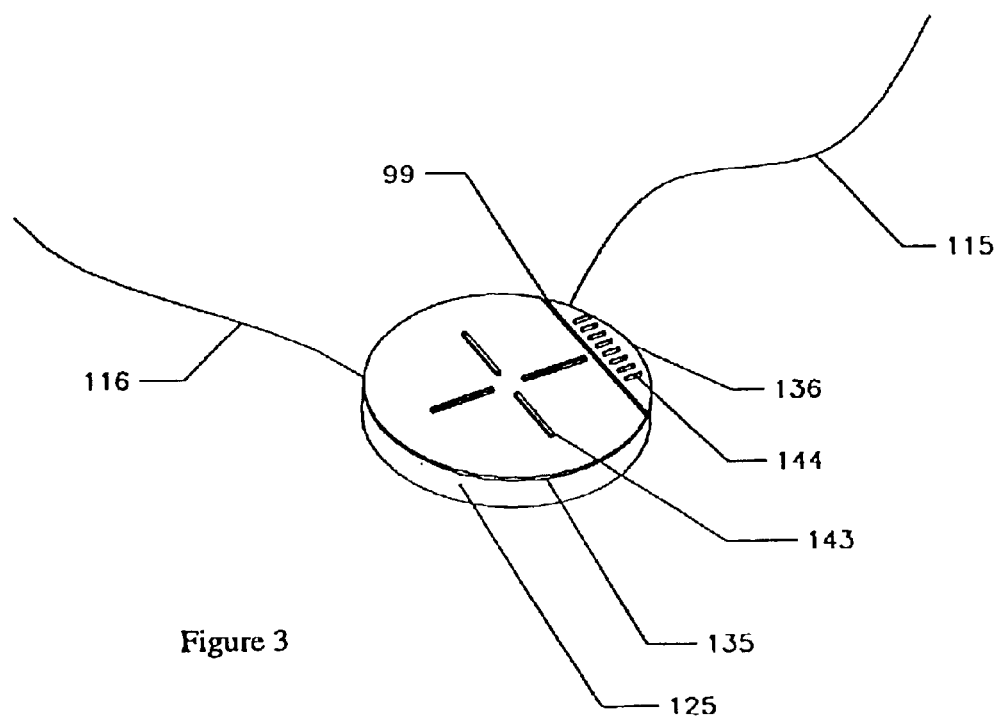
FIG. 3 shows a patterned electrode with two sections that can be independently controlled.

FIG. 3 shows an alternative embodiment in which the transparent conductor has been etched to create two segments which are on the same substrate but are not electrically connected. This shows a substrate 125, with a transparent conductor layer 135 and 136. These sections are not electrically commuting, as the layer is separated in two parts by the etch line 99. The patterned EC layer 143 and 144 are deposited respectively cm the two sections of the conductive layers. Also, wires 116 and 115 are connected respectively to the conductive sections so that power can be independently applied to these. In section 135 of the transparent conductor the tungsten oxide has been etched to form a crosshair pattern while in the other section 136 it has been etched to form a calibration pattern. The counterelectrode (or the transparent conductor on the second substrate of the device (not shown)) may not be etched. For non-etched counterelectrode only one electrical connection will be required for this substrate. The purpose of this device is to be able to color each pattern independently. Segmenting of substrates within the same device is also discussed in WO 01/84230. One could also etch both the transparent conductor and the electrochromic layer to yield patterns, as long as these are electrically connected to the powering leads via conductive paths. The opposite electrode, which may have an ion storage electrode coating, may also be etched in a mirror pattern corresponding to the design on the EC electrode and assembled so that the mirror image in one corresponds to the image in the other.

Any other method such as evaporation, sputtering, chemical vapor deposition, plasma assisted methods, etc., can be used for deposition of the electrochromic coatings. A preferred precursor and a method to deposit tungsten oxide by wet chemical method is described in U.S. Pat. No. 6,266,177, WO 01/84230, and U.S. Pat. No. 5,277,986.

EXAMPLE

Patterning Process of an EC Layer

Shipley (Shipley Company, Inc. 2300 Washington Street, Newton, Mass. 02162) Microposit 1813 photo resists was cast on to a tungsten oxide (composition of this lithium oxide doped coating was ($Li_{0.3}$W)O) substrate between 1000 and 3000 rpm. The tungsten oxide coating itself was deposited on a 15 ohms/square ITO coated glass (ITO coated glass was obtained from Applied Films, Longniont, Colo.). The substrate was then heated on a hot plate at 115C for 1–4 minutes. A contact photomask was aligned over the resist and the entire assembly was exposed to broadband UV light in an Atlas Electric Devices (4114 N. Ravenswood Ave, Chicago, Ill., 60613) Sun Chex for 15 to 30 seconds. Photo pattern was then developed in NaOH solution (solution concentration was 0.05 to 0.2 M) for 10 to 30 seconds (depending on the solution concentration). All the photo-resist from the exposed area washed off without harming the underlying tungsten oxide. This was rinsed with distilled water blown dry with clean nitrogen, then the developed pattern was baked for 15 minutes at 150C to harden the photo-resist so that it can withstand a higher concentration of the NaOH etching solution in the next step. The exposed $WO_3$ was then etched using 0.25 to 0.75 M NaOH for 10 to 30 seconds. The substrate was then rinsed with D.I. water and blown dry. The cross-linked photo resists was removed with acetone and the substrate was again rinsed with D.I. water and blown dry. None of these processes harmed the transparent conductor. The resulting $WO_3$ pattern was subsequently used to make a electrochromic device as described in FIG. 1a.

Etching of the transparent conductor and or the electrochromic film can be done by lasers, such as $CO_2$ lasers, YAG lasers and UV lasers. One may also etch patterns by photolithographic technology used in standard semiconductor processing. Printing methods such as pad printing and ink-jet printing could also be used to deposit patters of the electrochromic materials so that no etching is required. The electrochromic material precursor used for wet-chemically processed coatings is used as ink in the printing application. An example of such precursor for depositing the tungsten oxide and other ion storage electrodes are described above. One may even deposit the patterns of the electrochromic coating directly by using molded replicas, akin to rubber stamping and pad printing.

The line width of the pattern for these applications can vary from 1 to 1000 micro-meters, more preferably between 5 and 200 micro-meters. The smaller dimensions are preferred for those patterns which are magnified before viewing. It is preferred that the refractive index of the patterned EC material is matched with that of the electrolyte, particularly in the bleached state. The refractive index of the electrolyte can be changed by changing the medium constituents, i.e., solvent, plasticizer, polymer, salt type, concentration of these, and other additives. The refractive index of the EC material can be changed by changing its composition, porosity and microstructure (e.g., amorphous vs. crystalline). It is preferred that the refractive index of the two be within 0.1 of each other or more preferably within 0.005 of each other. Another alternative is to match the index of the transparent conductor to the EC layer, especially when the transparent conductor is patterned and the EC layer is deposited as a continuous layer on top of this pattern.

The device surface facing the outside may have anti-reflective coatings, permanently marked patterns, colored layers, etc. These may even be deposited on additional substrates which may be bonded or laminated to the device surfaces.

Application Area—Military Windows and Camouflage

Windows in military transportation, such as for trucks, tanks, ships, planes and submarines may require that the people and equipment inside may not be seen from the outside via these windows, particularly when it is dark outside. These windows may still have to provide vision to the people inside to be able to see the surroundings.

Figure 4:
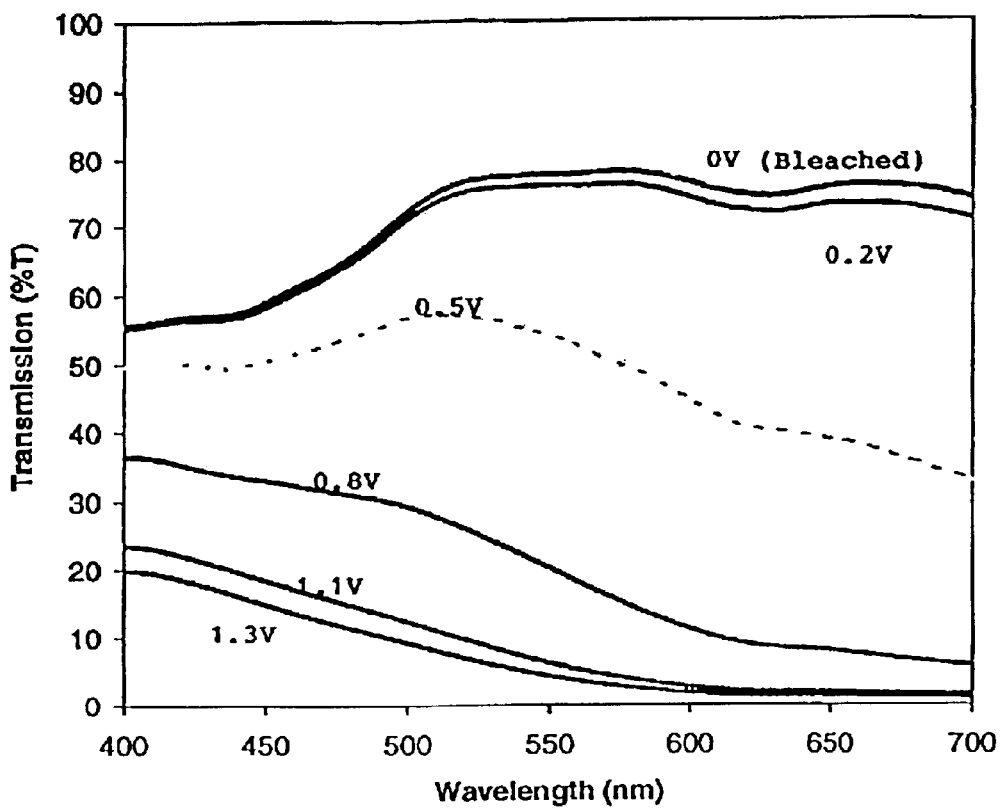
FIG. 4 shows transmissive spectrum of an EC device in bleach and at various coloring potentials.

FIG. 4 shows the transmission spectra in the bleached state and the colored state at various voltages for an EC device which has amorphous tungsten oxide as the EC layer (the composition of the layer is ($Li_{0.3}$W)O). The device is based on a construction shown in FIG. 1a in which the redox material in the electrolyte is ferrocene. The device is quite transparent to all visible wavelengths in the bleached state. In the colored state, is most transparent in blue and very low in transmission in the longer visible wavelengths. Thus, if the lighting inside the vehicle is a complimentary color to the window color such as red (600 nm and above), the inside light transmission will be highly reduced to an outside observer, while from the inside the view will be as if looking through a blue filter. During those times when such a safety is not needed the windows can be bleached for maximizing the view. FIG. 4 also shows that changing the color potential can control the tint of the windows. Windows may also be darkened to control glare, reduce IR transmission from inside which may be seen by the adversaries. The electrochromic materials and the interior lights are preferably chosen so that they are complimentary in coloration as described. However, even if white light is used inside the vehicle an electrochromic window will reduce its transmission to the outside environment.

Military camouflage can be also made using electrochromic devices to reduce the thermal signature, emissivity or change the visual appearance of the military buildings or transportation vehicles listed above. For example, electrochromic mirrors or windows can be tiled on the outer skin of these objects. When these are colored or changed from one color to the other color, their appearance would change. Further the tiled EC devices may be programmed so that they are always changing randomly or in a fixed sequence so that their images if taken will be different when compared by an offensive team. Similarly, if the emissivity of the skin is controlled by coloring or bleaching these windows so that it matches those of the surroundings, such vehicles or buildings will be difficult to detect. This camouflage is thus electronically deployable by changing the skin characteristics. The EC devices employed for protecting one object need not be all identical. For example there may be difference in the electrolyte layer or the electrochromic coatings so that patterns in color and emissivity can blend well with the surroundings. One may even use the concept of Moiré fringes in the camouflage. Typically, Moiré fringes are actively created or changed when one of the patterned substrate is mechanically moved (translated or rotated) against another patterned substrate. Here we activate this electronically (i.e., without any mechanical movement). However, mechanical movement may be added to the electronic effect described above.

To generate Moiré fringes a pattern is printed at least on one of the substrates (e.g., lines which are straight or curved on the outer face of one of the substrates). Etching the tungsten oxide makes a similar or different pattern. Assuming that these are straight parallel lines as on the outer substrate, the pattern in the tungsten oxide is positioned so that it appears rotated by a few degrees (less than 20 degrees, preferably less than 5 degrees) as compared to the lines on the outer surface. When the tungsten oxide colors the interference of light passing through the two fringe patterns results in Moiré fringes.

Figure 5:
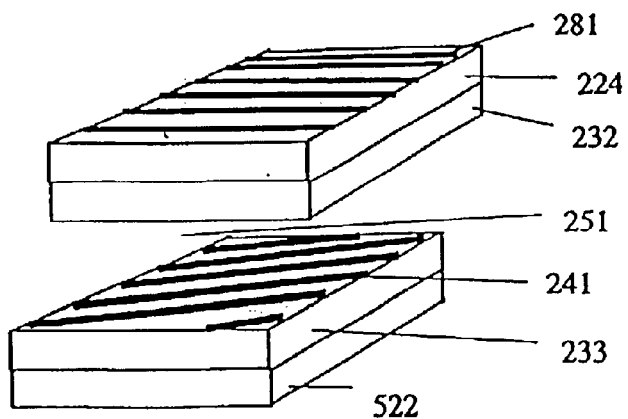
FIG. 5 shows an EC device which is capable of generating electronic Moire pattern

This is explained in more detailed by looking at FIG. 5. This shows an EC device made by a substrate 224 which has a permanently printed line pattern 281 on its outer face. The lines are substantially opaque with clear portions between them. The other face is coated with a transparent conductor 232. As an alternate, the print 281 could have been deposited below or above the conductive layer 232 on the same substrate face.

It is preferred that this pattern be conductive if deposited on top of 232 facing the electrolyte 251. An example of such a conductive material in contact with the electrolyte will be gold as it will not participate in reactions with the electrolyte. Another substrate 522 is coated with the transparent conductor 233, which is further coated with a patterned EC layer 241. A device is assembled as shown in FIG. 1a by joining the two substrates with an electrolyte 251. It is preferable but not a necessity that the index between the pattern in the bleached state and the electrolyte be matched as described above. The matching should occur for the wavelength of radiation which is expected to create the Moiré pattern. The EC pattern 241 in this example is identical to the pattern 281, but tilted by a few degrees around the normal to the substrate plane as shown. When the EC pattern is bleached an observer only sees the pattern 281 from the light passing through this window. When the EC pattern colors a Moiré pattern is created.

Figure 6:
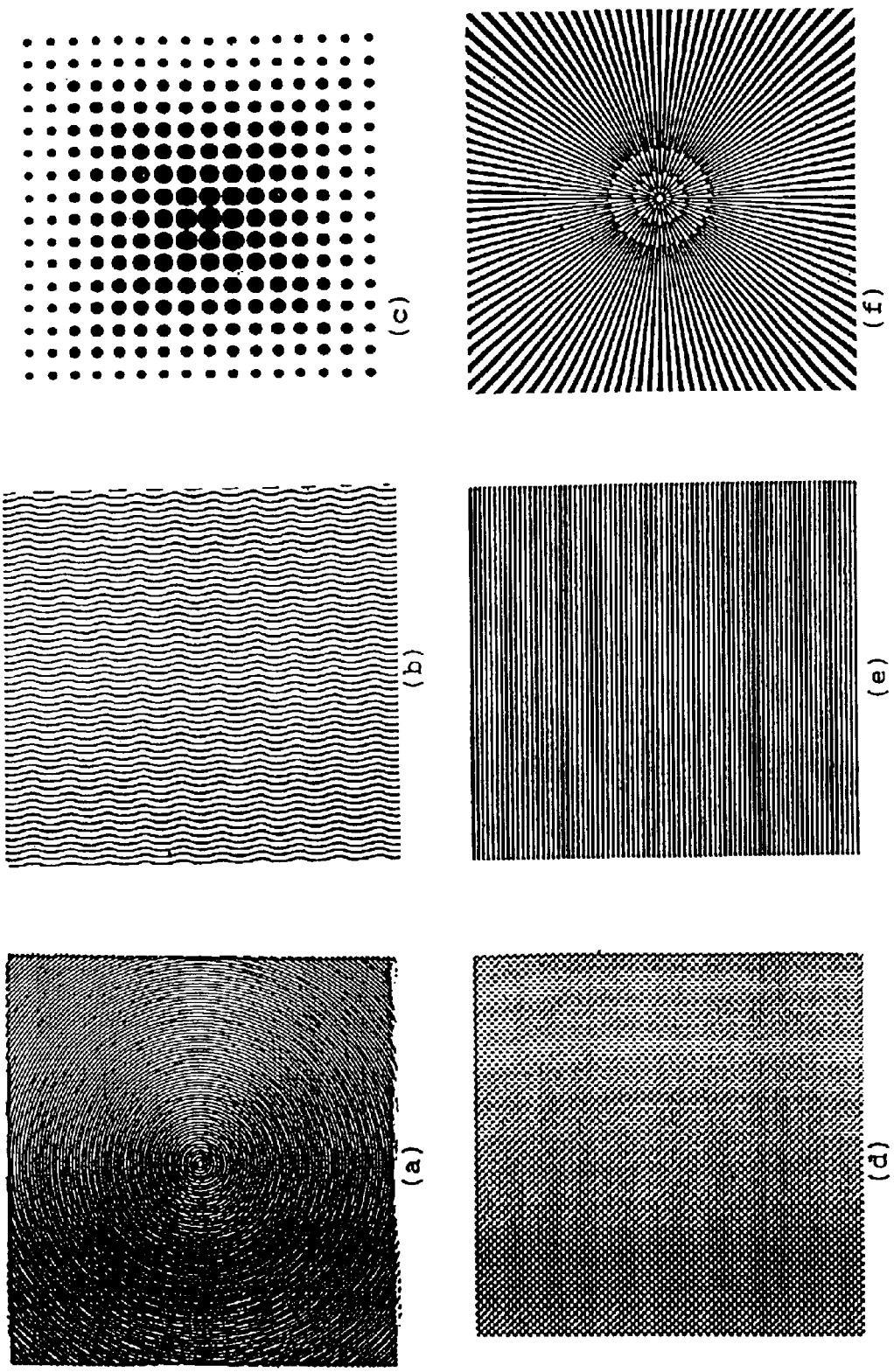
FIG. 6 shows examples of design patterns which can be used for forming Moiré fringe patterns.

FIG. 6 shows non-exhaustive samples of various patterns which can be used for creating Moiré fringes. The spacing and the width of the lines could be varied to suit the purpose; also in the same pattern these spacings need not be uniform. FIG. 6a shows a pattern made by concentric circles. FIG. 6b shows a pattern made by wavy lines. Two or more patterns may be placed (or displaced) or rotated against one another to generate the mismatch which will give rise to Moiré fringes. FIG. 6c shows a pattern made of circular dots of non-uniform size. FIG. 6d shows a pattern created by spots. FIG. 6e shows a pattern created by straight lines. FIG. 6f shows a pattern made by converging lines towards the center. The number of such lines and their width increases as one moves from the center to the outside border of the pattern. The width of the lines and their spacing could be as shown in these figures or they could be much wider (e.g., by a factor of 10 or more, and may depend on the electromagnetic radiation wavelength) or they could be much slimmer (but preferably greater than 10 times the average wavelength of electromagnetic radiation for which the Moiré pattern is being generated). As explained earlier the Moiré pattern may also be generated by the interference of two or more different patterns, say FIG. 6b and FIG. 6e, and in our invention at least one of which is generated electronically by a reversible EC (or any other chromogenic device, such as liquid crystal) device.

One may sandwich two EC devices to make a composite, where each EC device generates a pattern when colored. The interference between these two gives rise to the Moiré effect. In the bleach state the composite device is clear, but generates a Moiré pattern when both of these are colored. Another way will be to fabricate a device as in FIG. 1b without any external patterns, where the counter electrode is anodic coloring and the EC layer is cathodic coloring, and both of these are patterned. The patterns for both electrodes are so chosen that the device changes from a clear state to a colored state. Moiré fringes are generated as the colored patterns on the EC and counterelectrode create this interference.

Further, one of the patterns (usually on the outside of the device) can be mechanically oscillated in real time then the fringe patterns will change as well. One way is to have this pattern on a third substrate in the vicinity of the device, or a flexible net may be placed in front of the device which is oscillated.

Yet another novel way is to use the Moiré pattern for enhancing the conductivity of the conductive electrodes. In a window or a mirror construction at least one of the substrate and the conductive coating on it are transparent. To form the Moiré fringes one of the fixed pattern could be lines of a conductive metal such as gold which will increase the conductivity of the substrate. These could even be metal lines which are passivated. These busbar concepts are described in U.S. Pat. No. 6,317,248, the disclosure of which is incorporated by reference herein.

Application Area—Lab Optical

Optical instrumentation uses several types of optical elements many examples of these are, collimators, lenses, irises, wavelength selectors, diffraction plates, prisms, buffers, stops, modulators, interferometers and comparators. Such instrumentation is used in laboratories for scientific research (spectrometers, radiometers, materials analysis, image analysis), medical diagnostic labs (e.g., ophthalmic apparatus to check for metal particles in the eye, surgical equipment, pathological equipment), optical networking, optical communication test equipment) optical recording and retrieval, etc. EC technology can be used to make several components described above, particularly which need to be changed to condition signals, or use them for multiple purposes as demanded by the user and to eliminate moving mechanical components.

Figure 7A:
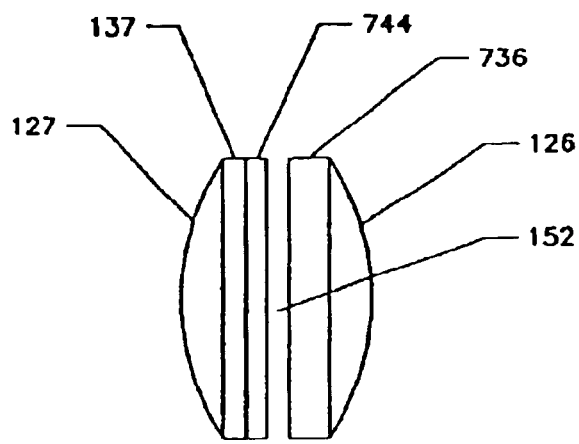
FIG. 7a shows a lens with integrated EC element
Figure 7B:
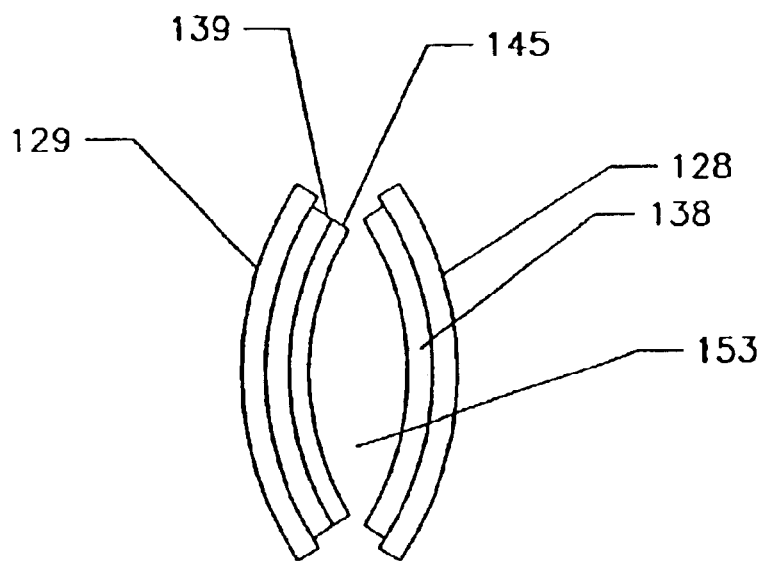
FIG. 7b shows a lens with integrated EC element
Figure 7C:
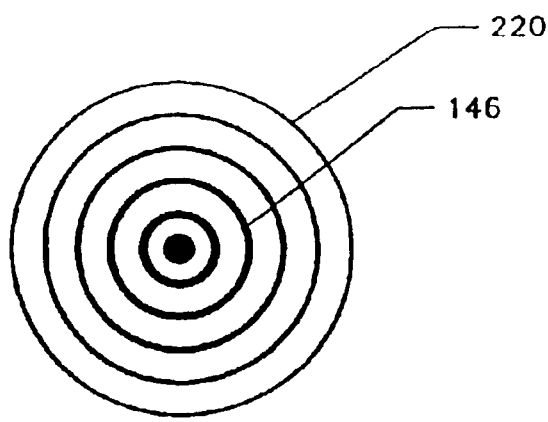
FIG. 7c shows a zone plate where the pattern is formed by EC action.
Figure 7D:
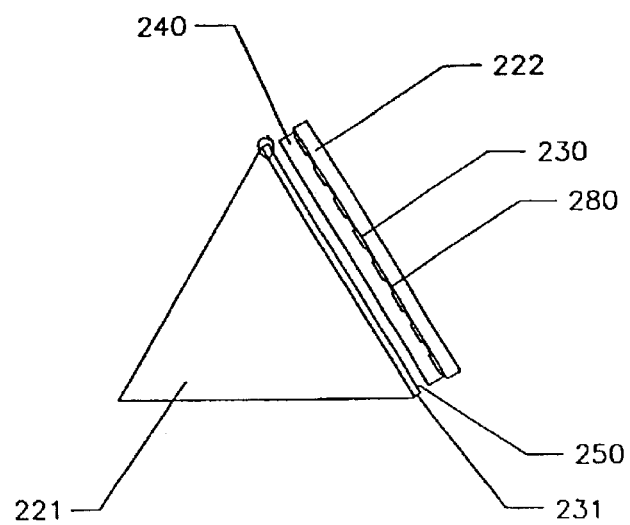
FIG. 7d shows a prism splitter where each wavelength segment can be independently modulated by an EC device.

To make a lens with active EC components one may get the lensing action from the inactive components of the assembly such as the substrates or from the EC layers. For example FIG. 7a shows a side view of a lens where the substrate has been shaped to provide the lensing activity. The plano-convex substrate 126 is coated with a transparent conductor 736. Another such substrate 127 is also coated with a transparent conductor 137 on the planer side followed by an EC layer 744. The two are bonded using an electrolyte 152 and then edge sealed (not shown) making a device similar to FIG. 1a. The electrical connections can be made by tabs or grinding the opposite edges slightly to expose the transparent conductor (not shown). Here the EC layers are planer, meaning they do not vary in thickness, and follow the substrate contour. In FIG. 7b (side view of a lens) the tensing action is mainly provided by the variable thickness of the electrolyte 153. The substrates 128 and 129 have a spherical bend where the insides of these are respectively coated with the transparent conductors 138 and 139. Free surface 139 is further coated with an EC layer 145. The electrolyte preferably has a refractive index greater than 1.4. This will also give a device similar to FIG. 1a, where the intensity of optical radiation passing through these could be modulated. FIG. 7c shows a front view of a zone plate where the EC layer 146 is patterned on a transparent conductor coated substrate 220. As described in above figures this is incorporated in a device using another substrate (not shown). In the bleached state this pattern is not visible but it is in the colored state and acts as a zone plate (lens).

To pattern electrodes several methods can be used as described above. Fine patterns (sub-micron) using silicone molds and photolithography can be generated inexpensively as discussed in the following publication, which is incorporated by reference herein, namely J. A. Rogers, K. E. Paul. R. J. Jackman and G. M. Whitesides, "Using an Elastomeric Mask for Sub-100 nm Photolithography in the Optical Near Field", Appl. Phys. Lett. 70, 2658 (1997); G. M. Whitesides and Y. Xia, "Replica Molding: Complex Optics at Lower Costs", Photonics Spectra, January 1997, p. 90

This technology typically consists of the following steps:
1. Preparation of a master relief pattern by photolithography or other techniques.
2. Transfer of the negative of the pattern to a mould made by in-situ polycondensation of an elastomer polymer (For example a silicone elastomer from Dow Corning (Midland, Mich.) Sylgard 184) to form an elastomeric mask.
3. Contact printing of the pattern on to a substrate using wet-chemical solution of the electrochromic material precursor.
4. Processing of the pattern (such as firing at elevated temperatures).

As described above a pattern can be etched by selectively removing the tungsten oxide layer. This pattern can be a diffraction grating. Thus, when this element is energized a diffraction grating is obtained, which would diffract the outgoing light beam, otherwise it is simply a passive element in the instrument. The voltage or the depth of coloration of the pattern can control the strength of diffraction. For example, if helium-neon laser is used as the light source (at 632 nm), these can be strongly diffracted by the blue gratings of the tungsten oxide. The diffracted light beam spots are spatially dispersed, which can be tapped for further processing. Once the grating is erased, these spots disappear. Thus this can be used as an optical switch to turn the spatially distributed diffraction spots on and off. Index matching between the electrolyte and the electrode is preferred as explained earlier.

Configurable lenses can be prepared using patterning methods. One could etch the tungsten oxide in a zone pattern of concentric rings as described in FIG. 7c. When colored, the diffraction results in a lens, which will focus a parallel beam at its focal point, or make a point source placed at its focus into a parallel beam. Individually addressable concentric rings can be used instead of a mechanical aperture. The aperture is then closed down by selectively coloring each successive ring.

EC elements can be integrated in other optical elements such as prisms and filters. Example 7d shows a prism 221 which has a transparent conductive coating 231. Another transparent plate 222 is coated with stripes of transparent conductor 230 separated by non-conductive areas of the substrate, but preferably where such separations 280 are not optically transparent. This striped layer is further coated by an EC layer 240 and then assembled with an electrolyte 250 to form a device with the prism. The stripes 230 can be individually activated and will only result in coloring that part of the EC layer which is in contact with the stripe. One may even pattern the EC layer conforming to the stripe pattern. The prism acts as a wavelength splitter. The various wavelength sections will pass through the different stripes and their intensity could be modulated independently. This type of principle can be used for other multiplexers or de-multiplexer filters used in the optical industry. A feedback loop can be used to control the intensity of the transmitted beams. An EC device without individual controlled elements described above will attenuate all of the incoming or the outgoing beam.

Using an EC filter can change the color of the light. For ophthalmic instruments which locate metal particles in the eye, the EC element can be colored electronically rather then inserting a mechanical element in the instrument. Further if the color is changed it acts like a filter being inserted in the light path which has several functions, such as control of light intensity and color, reduce chromatic aberration to get sharper images, reduce light intensity without effecting the depth of focus.

Electrochromic devices may also use materials which change color with changing voltage, typically such EC devices utilize materials based on Lutetium compounds. In this case colors or wavelengths can be selected. Regardless of which color EC devices change to, they can be combined with a narrow band-pass filter to yield a variable transmissive device. This is particularly an advantage with the tungsten oxide based devices, since they absorb in a wide wavelength region, they can be combined with almost any band-pass filter in the visible and the NIR region to yield a monochromatic modulator. This procedure is described in U.S. Pat. No. 5,724,187. Modulated beams can be further used in interferometry and signal conditioning depending on the desired function. Electrochromic elements which offer neutral density are also useful. A preferred ND filter should be capable of attenuating between 400 and 700 nm of the spectral range. Also at any level of coloration, we can define the neutral density as following: the optical density at any wavelength between 400 and 700 nm should be within ±0.2 of the optical density at 550 nm, or more preferably within ±0.1. The next section describes preferred composition of EC electrodes for neutral coloring devices.

Application Area—Filters For Photography

Filters are used extensively in photography and video systems. Filters are used to change the ambience and the mood of the settings. Further, many filters are required not only for various colors but even to change the depth of colors. Filters are also required which may not cover the lens completely, e.g., the top half part may be colored and the rest colorless. Thus it gets very cumbersome to carry these filters and time consuming to determine proper settings. Thus EC technology can be used to provide filters that could be colored to different depth or to different colors as described above. These filters may also be segmented so that the segments can be tinted as selected by the user. For example, filters based on tungsten oxide and the construction described above can be used for variable blue filters provided the electrolyte colors only a little or in a blue hue. Devices with electrolytes using ferrocene redox materials with tungsten oxide electrode will color blue, and these electrolytes containing phenothiazene (e.g., see U.S. Pat. No. 5,724,187) redox materials will color more neutral. Redox materials could be combined and/or tungsten oxide can be doped to get the desired color.

One may also choose an electrochromic filter where it only colors in the near infrared (NIR) region. For example crystalline tungsten oxide is know to block NIR more effectively as compared to the visible radiation. Amorphous tungsten oxide blocks in both the visible and the NIR. Crystalline tungsten oxide mainly modulates by a change in reflection and amorphous tungsten oxide by a change in absorption. This may be useful for cameras or other equipment (such as night vision equipment) which needs to work both during the night (using infrared radiation) and day (using visible radiation) and employs a CCD (charge coupled devices) or CMOS (complimentary metal oxide semiconductor) electronic imagers. Thus during the day when the light is bright, one may block the NIR so that the image is sharp and is not distorted by the chromatic aberration due to the NIR During the evenings when the visible light is low, one may allow the NIR radiation to go through to increase the image brightness. One may even switch from one image to the other during the day or night, store these and compare them and/or digitally process them to see the differences and get information which was not otherwise available.

Doping of tungsten oxide with individual element oxides molybdenum oxide (Yamada S., Kitao, M., "Large Area Chromogenics: Materials and Devices for Transmittance Control", Lampert C. M., Granqvist, C. G., eds., p. 246, The International Society of Optical Engineering (SPIE)), or zirconium oxide (Siddle, J. R., WO 99/08153) or vanadium oxide (Krings, L., et. al., WO 97/22906) makes it more neutral coloring. We have discovered that those compositions which are neutral and have good reversibility have two transition metal oxides as dopants in tungsten oxide. These two dopants are vanadium oxide and molybdenum oxide. There may be other added dopants such as alkali metal oxides (such as lithium oxide, sodium oxide and potassium oxide) for improving the kinetics and other transition metal oxides to improve the UV resistance. Examples of preferred oxides for improving the UV resistance are cobalt oxide, chromium oxide and copper oxide. The addition of alkali oxides and the UV stability imparting oxides listed above are described in U.S. patent application Ser. No. 09/443,109. Since the preferred compositions of tungsten oxide may consist of more than two or more oxides, it is very difficult to control their compositional uniformity both spatially and through the thickness repeatedly by those methods where these coatings are deposited by building thickness using molecular dimensions such as vapor processes. Vapor processes include sputtering, evaporation, chemical vapor deposition, etc. The preferred route to do this is by wet chemical method where all of these are uniformly mixed in a precursor form and then deposited. An example to do this is described below.

Example

Preparation of a Neutral Tungsten Oxide Coating

A tungsten peroxy ester (PTE) precursor is made from tungsten metal as described in U.S. Pat. Nos. 5,457,218 and 5,277,986. A solution was made using 0.45 g of PTE/ml of ethanol. Separately 1.0 g of molybdenum (II) acetate dimer was reacted by dispersing in 25 ml of ethanol and titrating into the mixture 30wt % hydrogen peroxide at 0° C. Once all the molybdenum dimer had reacted with the peroxide as indicated by formation of a complete solution the peroxide addition was stopped and the mixture allowed to stir a 0° C. for 30 minutes. The product was then isolated under reduced pressure at 35° C. in a rotary evaporator. This product was then added to the PTE solution (27g PTE in 60 ml of ethanol) resulting in a green-yellow clear solution. Vanadia was added to the solution in the form of $HVO_3$ in ethanol. The vanadia was prepared by an ion exchange method by dissolving 29.93 g of lithium metavanadiate in de-ionized water (4.9 wt % solution).

This solution was then passed through an ion exchange column filled with cation-exchange resin Dowex Monosphere 650C in $H^+$ form. The final solution was orange in color and transparent. This solution was sonicated at approximately 25° C. for 2 hours until it turned into a homogenous gel of dark red color. Triethylamine was then added to the gel in the weight ratio 6.3 g $(CH_3)_3N$: 120 g $HVO_3$. After stirring for 2 hours this resulted in a clear solution. This solution was concentrated under reduced pressure in a rotary evaporator at between 38 and 40° C. to 6.6% of its total volume. The final product was then dissolved in ethanol in a ratio of 0.42 g $HVO_3$/ml of ethanol. Based on 1 ml of PTE solution, 0.19 ml Molybdenum containing solution and 0.161 ml vanadium containing solution were mixed. This was used to deposit a coating on the conductive side of TEC 8 (Obtained from LOF Pilkington, Toledo, Ohio) glass substrate of an approximate size of 8 cm×8 cm. The coating was deposited on a spin coater with its chuck rotating at 900 rpm. The coating was air dried and heated in a two step process as by first heating the coating under a controlled humid atmosphere to 135° C. followed by heating under ambient atmosphere to 250° C. at a heating rate of 11° C./min and holding at 250° C. for one hour. The final composition of the coating was $(Mo_{0.05}V_{0.1}W_{0.85})O$, and its thickness was 385 nm.

Devices were made as described in U.S. Pat. No. 6,178, 034 using this and $(Li_{0.3}W)O$ as EC coating. The counter electrode was another TEC 8 substrate with its conductive side facing inward. The electrolyte thickness was 210 microns and the composition was 0.05 molar t-butylferrocene and 1.0 molar lithium trifluoromethane sulphonate in a solvent mixture of 60:40 volume % propylene carbonate and tetramethylene sulfone.

Figure 8:
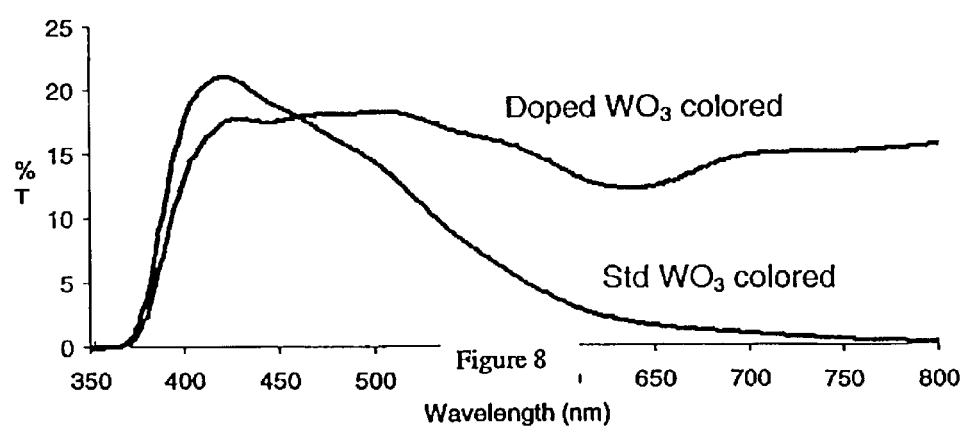
FIG. 8 compares transmission spectrum in the colored state of a EC device with neutral and blue coloring EC layer.

FIG. 8 shows the spectra of these devices in the colored state. Clearly, the doped coating with Mo and V $((Mo_{0.05}V_{0.1}W_{0.85})O)$ exhibited a more neutral color and the standard one was blue. The preferred combined atomic ratio of V and Mo to W (i.e., $((Mo+V)/W)$ is 0.03 to 0.4, and the ratio of Mo to V is 0.2 to 2. The small depression in the colored state spectrum of this device at about 640 nm is caused by t-butylferrocenium in the electrolyte. This peak can be reduced or eliminated by substituting the redox material in the electrolyte either in full or in part. U.S. Pat. No. 5,724,187 describes examples of alternate redox materials and a preferred one is phenothiazine.

Example

Compositions for Neutral Counter-Electrodes

To make devices such as in FIG. 1b, neutral coloring counterelectrodes must be employed, such as those containing iridium oxide. Further the composition of the EC and the counterelectrode can be tuned so that if one of the electrodes does impart color, the other one will impart a complimentary color to give a neutral appearance. As an example, the tungsten oxide composition in an EC layer may be combined in a device with anodically coloring nickel oxide counter electrode compositions which color brown. Nickel oxide itself may be doped to result in more neutral color. Here we will describe a novel composition based on vanadium oxide which contributes very little to the device color and results in a color which is primarily dependent on the EC layer. Thus an EC layer described in the above example and combined in a device with this counter electrode will result in substantially neutral devices.

$V_2O_5$ is a known ion-insertion electrode. This electrode is brilliant yellow in its bleached state, which is difficult to neutralize in a device only by the EC layer based on tungsten oxide. For example color of such an electrode (200 nm thick on TEC 8 (TEC 8 is available from LOF Pilkington in Toledo, Ohio) in its bleach state can be given on a $L^*a^*b^*$ coordinates as 80, −9.6,67. The $b^*$ value of 67 shows the yellowness in color. This value and if possible $b^*$ must be reduced for this to effectively combine with the tungsten oxides described above for neutral devices. The procedure to make $V_2O_5$ coatings is described below. We discovered that vanadium oxide when doped with at least one of tin oxide and antimony oxide results in such coatings. These coatings can be doped with antimony oxide and tin oxide. Other transition metal and alkali oxides can also be added as dopants.

As an example a preferred composition of a coating $(Sb_{0.03}Sn_{0.4}V)O$ resulted in $L^*a^*b^*$ coordinates of 86, −4, 24. As this coating is low in color as seen by smaller $a^*$ and $b^*$ values. To the eye this appears faint yellow and when reduced by inserting $Li^+$ions it goes to a faint gray color. Also, for effective counterelectrode these materials should be able to reversibly incorporate charge. The charge capacity of the vanadium oxide coating was 29 $mC/cm^2$ (process for making this coating is described later) and for the doped 330 nm thick coating the charge capacity was 24 $mC/cm^2$. Preferred compositions will have the atomic ratio of (Sn+ Sb)/V in the range of 0.2 to 0.6 and Sb/Sn ratio of 0 to 0.5 in those compositions where both antimony and tin oxide are present.

Example

Preparation of $V_2O_5$ Coatings

This is a novel method and a vast improvement over the current art. The current wet-chemical method described in the art can be demonstrated in the published PCT application WO99/45169 and in Nabavi, M., Materials Science and Engineering, Vol. B3 (1989), p. 203. Although the former publication describes coatings doped with lithium, but still several drawbacks are evident from this. First, the coatings could not be treated to high temperatures (typically less than 200C) as their optical quality decreased due to increasing haze. This severely limited its charge capacity due to its amorphous state. In this patent application the best coatings had a charge capacity of less than 10 $mC/cm^2$.

When these procedures were followed, the solutions had poor coating characteristics, i.e., the coatings were substantially non-uniform and high in haze. Further the shelf life (meaning that it could be used to make reproducible coatings under similar conditions after storing the solution for a while) was so poor that the solutions when formed had to be used immediately. The second references yielded 0.5 micron thick coatings, but its charge capacity was only about 10 mC/cm². It is important that the EC device have sufficient charge capacity per unit area so that high contrast can be obtained. We have determined this number to be greater than 20 mC/cm² of the coated area Thus our purpose was to remove all these problems utilizing a wet-chemical method. This should be achieved in one coating step to keep the costs of the devices attractive. Generally to obtain thick coatings one would coat followed by a heat treatment which is at least above the boiling point of the major solvent used in the coating solution medium, and then repeating this several times, and then giving a final heat treatment.

Our objectives were:
1. To produce high optical quality (less than 10% haze, preferably lower than 5% haze) $V_2O_5$ coatings on commercial transparent conductors. Haze is measured according to ASTM D 1003.
2. The coatings had to be above 200 nm in thickness, preferably up to 400 nm, all produced in one coating step. The important aspect is any thickness in one coating step which will give a charge capacity of 20 mC/cm² or more in one step for economical reasons.
3. Fast kinetics, where the charge reported above is extracted within 120 seconds.
4. The solution had to be inexpensive and have good coating characteristics.
5. Good shelf life is important, preferably greater than one week at room temperature.

Solution Preparation:

The coating solution was prepared using lithium metavanadate ($LiVO_3$) as starting material and using an ion exchange technique to convert it to the acid ($HVO_3$) and using a base to stabilize the solution and also enhance its coating quality. For the coating solution the carrier solvent was ethyl alcohol. The procedure is divided into four steps as follows:

Step I. Ion Exchange formation of $HVO_3$

Two chromatography columns of dimensions 41×500 mm were packed with 200 g of dry resin (Cation-exchange resin Dowex Monosphere 650C in H+-form with exchange capacity -2 meqv/ml.). The columns were filled with DI water and allowed to stand for 24 hours. 29.93 g of $LiVO3$ was dissolved by heating to approximately 60° C. and stirred for one hour in 574.7 g of de-ionized water (4.9 wt % solution). The solution was then vacuum filtered through GF/F glass fiber filter (0.7 $\mu$m particle retention). The columns were flushed with water and the $LiVO_3$ solution was then added (to the column) and discharged through the column drop wise. To completely remove all the $HVO_3$ from the columns they were flushed with de-ionized water. A clear liquid exiting from the column indicated the end point. The time to pass the $LiVO_3$ through the column was 0.5 hours. The collected solution was orange in color and transparent. After approximately 30 minutes dark red fluffy solids formed and continue forming while standing for about 24 hours at which time it ceased. The resulting product was sonicated for two hours at a starting temperature of 25C and rising to between 30 and 50C. This resulted in a homogenous gel of dark red color.

Step II. Addition of Triethylamine $(CH_3)_3N$

Triethylamine was added to the sonicated gel in the weight ratio: 6.3 g $(CH_3)_3N$: 120.0 g $HVO_3$ gel. After a few minutes of vigorous shaking the gel breaks up and turns into a brownish-greenish transparent solution. The solution was then sonicated for one hour resulting in a clear liquid with grayish a tint. The addition of organic base which in this case was triethylamine, was important to achieve good coating characteristics, good solution forming characteristics and shelf life.

Step III. Concentrating of the Above Solution via Vacuum Evaporation 3789 g of the solution with triethylamine from step II above was concentrated under reduced pressure at between 38 and 40° C. in a rotary evaporator to 249.3 g. The consistency of the concentrated product was syrup-like with a purplish-brown color. This material was very stable and could be stored for several weeks and possibly several months under ambient conditions.

Step IV. Preparation of Coating Solution 249.3 g of the "syrup" solution from step III above was dissolved in 600.0 g of ethyl alcohol and mixed by rotation under ambient atmosphere for 20–30 mins to form the coating solution. The solution was stored in a refrigerator at 4° C. and had a shelf life (meaning that it could be used to make reproducible coatings under similar conditions) of several months. The solution had a shelf life at room temperature of several weeks.

Sample 1: Coating Deposition and Processing

The solution from step IV above was deposited by dip coating onto tin doped conductive glass "TEC Glass" under ambient conditions (TEC glass is made by LOF Pilkington, Toledo, Ohio)). At a withdrawal rate of 13.2 cm/min the final thickness (after firing as described below) of the coating was 275 nm and at a withdrawal speed of 18.7 cm/min the thickness was 400 nm. The coatings were heated in a two-step process the first involved firing under a humid atmosphere to a maximum temperature of 150° C. ("Humid firing" or "humid treatment") as listed in Table 1. The second firing process involved firing to 400° C. under ambient atmosphere with a heating rate of 4° C./min and holding at 400° C. for one hour ("High Temperature Firing"). The sample was cooled to room temperature at approximately 5° C./min. The coatings were transparent and yellow in color. The % haze of the 275 nm coating was measured using an Ultra Scan Colorimeter from Hunter Lab (Reston, Va.) and was found to be 10.3%. As will become evident from the following examples, inclusion of "Humid Firing" was important to reduce the haze in coatings with high thickness. "Humid Firing" for this invention is generally characterized as keeping the coatings at any temperature above 60C for more than 10 minutes, when the humidity is equal to or exceeds 50%.

Figure 20:
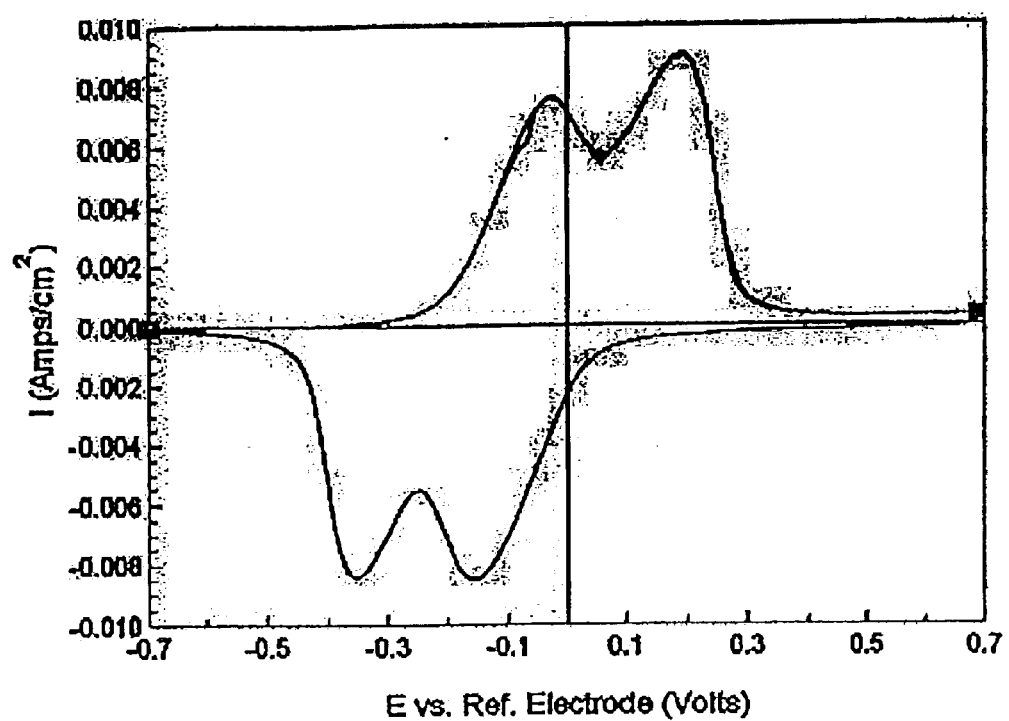
FIG. 20 shows six CV traces of a vanadium oxide sample overlapped over each other.

The charge capacity was measured in a three-electrode configuration using platinum as the counter electrode and Ag/AgNO3 as the reference electrode. The solvent was 1 molar lithium perchlorate in propylene carbonate. The sample size was 7 cm². Prior to measuring the charge capacity the sample is cycled 6 times using the three-electrode system to check reversibility. This is done from –0.7V to 0.7V against the reference by increasing the voltage from one limit to the other and then decreasing back to the first limit at 10 mV/second. The current is recorded. A trace is made of current vs. voltage. These traces (called C-V traces) from the six cycles have to visually overlap each other for acceptable reversibility. FIG. 20 shows the six traces beginning from the first trace. Then the potential of the sample is equilibrated at –0.6V (completely oxidized). A step potential from –0.6 to 0.2 volts versus the reference is applied. The current is recorded versus time after the application of the step potential. This current decreases from a high value to about zero. The measurement is stopped after 120 seconds. The charge below this curve is integrated and is divided by the active area of the coating on the sample to get the charge capacity. The electrode the charge capacity of the vanadia coating (230 nm) was calculated to be 35.5 mC/cm$^2$ (or 0.1 mC/cm$^2$-nm). All these measurements are done at room temperature (nominally 25° C.).

TABLE 1

Humid oven firing profile

| Step # | T ° C. | RH, % | Time, min |
|---|---|---|---|
| 1 | 25 | 40 | 5 |
| 2 | 60 | 60 | 20 |
| 3 | 150 | 10 | 80 |
| 4 | 80 | 8 | 40 |
| 5 | 60 | 8 | 20 |
| 6 | 25 | 30 | 20 |

Samples 2 and 3: Coatings Prepared With and Without "Humid Firing"

Vanadium pentoxide coatings were prepared and deposited as described in example 1 except that the coatings were given "High Temperature Firing" without the "Humid Firing". The final thickness of the coating deposited at a withdrawal rate of 13.2 cm/min was 275 nm. The haze value of the coating measured as described in example 2 was 20.1%. Another sample was made by single dipping a TEC 8 substrate which was given a humid and a high temperature treatment. The sample thickness after firing was 325 nm. Haze value was 6.5% and the charge capacity was 42.8 mC/cm$^2$.

Sample 4: Coating Prepared With a Different Precursor

Vanadium pentoxide coatings were prepared and deposited as described in example 1 except that the starting material was sodium metavanadate. At a withdrawal rate of 15.84 cm/min the final coating thickness was 279 nm and the haze value was 8.8%.

Sample 5: Effect of Firing Treatment on Different Starting Coating Precursor

Vanadium pentoxide coatings were prepared as described in example 3 above except that one set of the coatings was not given the "Humid firing" step and another set was. A comparison of the haze and thickness of the coatings is given in Table 2.

TABLE 2

| Firing conditions | Thickness, nm | Haze, % |
|---|---|---|
| Standard (400° C., 1 hr) | 169 | 4.59 |
| Humid + standard | 170 | 1.98 |

The coatings of this invention are also usable for batteries, particularly thin film batteries due to their high charge capacity.

The EC devices should preferably conform to the specifications for neutral density described earlier. These filters can be used in digital photography, particularly where light has to be controlled without affecting the depth of focus (constant aperture opening). Also EC filters could be used to extend the dynamic range of the imaging sensors. Since the optical density of the EC filter is proportional to the applied coloring voltage, the microprocessor in the camera can take the applied voltage into account to calculate the real intensity being imaged. Neutral coloring EC windows find applications beyond which are listed here such as automotive windows and mirrors; and windows for a variety of transportation and architectural uses.

One may even use an EC window where the stops are a patterned EC device in the shape of frames, to select the area which needs to be imaged or recorded. For example one may choose from a 4:3 and 16:9 format. As described in above in "Sights," the filter can be segmented in many areas, by etching fine lines in the transparent conductor and also etching the EC layer and repeating the same on the counterelectrode side if required. As long as each segment is individually addressable one could darken any number of segments coloring selected areas, e.g., a spot in the center of the lens. One may even use EC filters to color in such a way so that near one edge a deeper coloration takes place which fades gradually as one moves away from that edge (gradient filter). One convenient way of doing this is using the device of FIG. 1a, or any device which has substantial back reaction, i.e., the device self bleaches when the power is removed. The electrolyte gap could be so chosen that the back reaction is high. This current can be changed by electrolyte composition and its thickness. Further, the magnitude of this current will depend on the device size, its geometry and the busbar pattern and on the device-area over which the coloration is needed. One may even taper the electrolyte gap so that the coloration is more substantial in wider gap and decreases in narrower gaps due to increasing back reaction in the narrower areas. The camera filters may be coated with antireflective coatings to increase the image sharpness.

The photographic filters or any of the other devices described can also combine EC feature (which is user tunable) with static filters. This means use of substrates or combination with elements which have specific light transmission and reflection properties. Examples are colored bulk substrates, substrates coated with colored coatings, antireflection, UV blocking and IR blocking coatings.

Other Surface Area Applications of EC Devices

Patterned chromogenic films incorporated in EC devices can be used to add utility and aesthetics in a variety of equipment. EC windows can be used to provide various aesthetically unique surface treatments for objects such as equipment cabinets for stereo and video system cabinets, kitchen cabinets and appliance windows used in kitchen, entertainment, laundry, etc. When the equipment is not in use the windows may be colored to hide the equipment by providing an overall dark surface appearance that obliterates the details of individual components and controls or to protect the equipment from the natural sunlight coming from building windows, halogen and mercury lamps, etc. Further, the button covers, and display windows on the equipment itself could have electrochromic covers to indicate which aspects of the system are active or non-active by dimming certain windows. For those EC devices where dimming takes place in the IR region (such as those containing tungsten oxide), one could block the communication from an IR remote, thus providing a disabling feature. This feature can be used in controlling the remote communication between objects such as in buildings, automobiles, appliances and in defense (land, air and navy). An application area in defense is where the transmission windows in missiles may be darkened (uniformly or in a pattern) and made to obstruct or distort (using a Moiré pattern described above) the wavefront of the impinging optical radiation, microwaves, etc., for protection of the interiors, or prevent electronic or optical jamming of the systems.

EC windows can be coupled with transparent touch-sensitive panels to form an interface or control panel. Such a window can be transformed from a transparent state to a control panel where the labels are displayed on demand. These panels could be integrated into applications such as audio or video component cabinets, microwave ovens where the window also serves as the control panel, wine storage racks with front windows, projectors and the like. Additional functionality can be added to these panels by segmenting the EC display such that a fully darkened state can also be achieved which could provide a concealing functionality. This would allow the panel to, hide and/or protect equipment or goods from undesirable radiation, e.g. protecting wine from ambient light. The panel could also be patterned such that information could be displayed allowing functional and aesthetic use of areas not presently used for such purpose, e.g. display of wine cabinet temperature and humidity.

Application Area—Use of EC Devices in Projectors

EC devices can be used to modulate or cut (filter) light from projectors. It is well known that the life of high intensity light sources is materially affected by turning them on/off. By inserting an EC device between the light source and the exit pupil the amount of light can be throttled or patterned to cut the light in specific amounts or sections. Also since the coloration depth is continuously variable, such device can be used to cut off some intensity to highlight or to reduce the importance of that area during a presentation. One could make the light transmissive or reflective platform of the projector (e.g. an overhead projector) from an EC device which is segmented, and segments can be controlled independently. Touching the specific area can darken each of the segments. The touch sensing can be provided on the outer surface of the EC device by adding another element. The addition can be by lamination. The touch sensor can work via a membrane switch or capacitive means as known in the art. Alternatively it can be combined with an imaging feedback system (e.g., by using a camera) so that when the user points to information (physical touch or optically, e.g., by pointing a light beam) on the screen that area is selectively darkened. One may even be able to select areas which need to be projected depending on the presentation size and shape, e.g., electronic cropping of edges. The amount of cropping required could be automatically adjusted with an imaging control or done by a manual interface.

Application Area—Fiber Switching

Optical fibers and the related technology are rapidly being adopted in communications and networking. All of these at present have been adopted to work in the NIR region. Typically the optical networking (or local area networking, LAN) takes place in the region of 800 to 900 nm, and the telecommunications in the range of 1300 to 1700 nm. Many principles described here are usable for all wavelength devices, such as fiber-optic lighting, but particular focus is placed in the above wavelength regions due to high commercial interest. Many concepts described earlier, particularly for "lab optical" are applicable to this area as well.

Electrochromic technology, particularly based on inorganic oxides and conductive polymers is suitable to modulate transmission in these ranges. Modulation of light for these applications is required for many reasons, some of them are:

a. To control intensity and/or to block light. In one of the instances where the intensity control is required if the light is being split into a number of wavelengths (wavelength division multiplexing, WDM), but either the source or the amplifier (e.g., erbium doped fiber amplifiers in telecommunications) cause intensity variations amongst these wavelengths due to non-equal emittance or gains, respectively.

b. To switch light from one path to the other.

c. To split the light beam in more than one path.

Some of the patents and applications which describe the use of EC elements for such applications are U.S. Pat. No. 4,245,883 and WO 99/55023. Both of these references fail to describe EC devices which are reversible in a practical sense since the electrolytes discussed are ion conductors. There is no ion-insertion counterelectrode layer in the device or a redox additive in the electrolyte in the shown configuration, which will balance the reaction once the tungsten oxide, is colored. While such devices may color a few times, they fail to be reversible when subjected to thousands of cycles, particularly with increasing temperatures. Thus, referring to WO 98/08137 cited earlier, one will either require an additional ion-storage layer as seen in FIG. 1b or 1f the same layer configuration is used as in U.S. Pat. No. 4,245,883 or WO 99/55023 (also shown in FIG. 1a), then a redox additive must be used in the electrolyte layer. Examples of redox additives can be a metallocene such as ferrocene and its derivative, lithium iodide, etc. The above principles can be used to make reflective devices such as mirrors and half mirrors as well. The reflective coating can be on one of the outer surfaces of the substrate or can be substituted for one of the transparent conductors.

Figure 9:
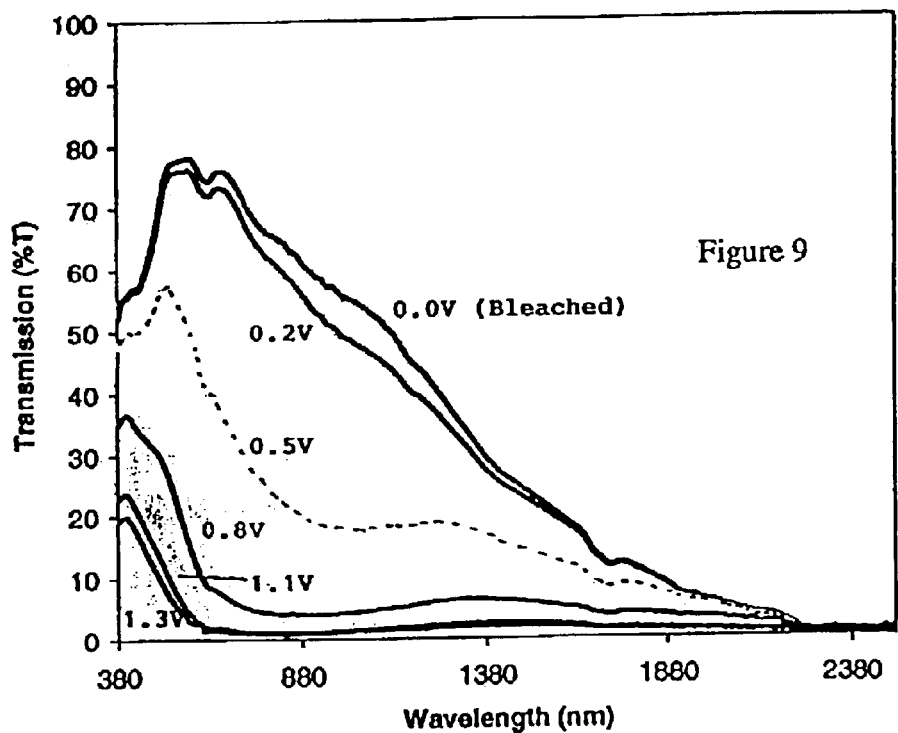
FIG. 9 compares transmission spectrum in the colored and the bleached state of an EC window device with high conductivity transparent conductors.
Figure 10:
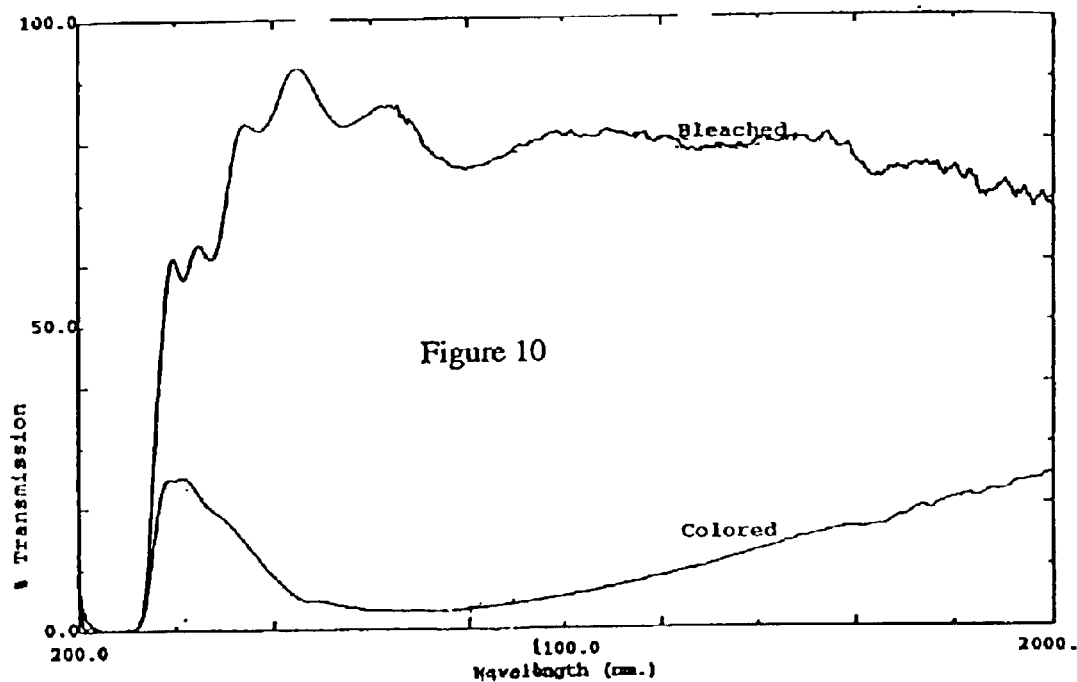
FIG. 10 compares transmission spectrum in the colored and-the bleached state of an EC window device with low conductivity transparent conductors.

Further, the EC devices use transparent conductors which reflect in the infrared (IR). FIG. 9 shows a spectrum of a device based on lithium oxide doped tungsten oxide and as constructed in FIG. 1a. The high attenuation in the bleach state is caused by reflectance from the transparent conductor which in this case was 15 ohms/square of fluorine doped tin oxide. One has to use high transmission conductors so that the attenuation in the IR in the bleach state is low. One such method is to use Si for conductivity, which is described in "An Electrochromic Variable Optical Attenuator (ECVOA)" by Nada O'Brien, et.al. in Conference on Optical Fiber Communication, Technical Digest Series, 1999. They use gold on the other side as this is a reflective device. The use of Si would be fine for telecom purposes, but not for the local networks (e.g., metro networks) where wavelengths of about 800 to 900 are used. These wavelengths are absorbed or reflected by Si. In our investigations we found that transparent conductor, such as ITO can be used for this purpose as long as its surface conductivity is greater than 25 ohms/square. Since the size of the devices is small (typically smaller than one square cm of the active area), this conductivity is adequate for EC devices in telecommunication applications. FIG. 10 shows the characteristics of transmissive optical attenuator made using ITO with a conductivity of 80 ohms/sq. This shows that the bleached state transmittance can be increased in the infra-red region by changing the transparent conductor. For networking applications conventional transparent conductors below or above 25 ohms/square may be acceptable as the attenuation at about 850 nm (FIG. 7) is not too low in the bleached state. For reflective devices the second conductive coating need not be transparent. A preferred material is gold, but others such as rhodium and alloys of these materials will also be suitable.

Figure 11:
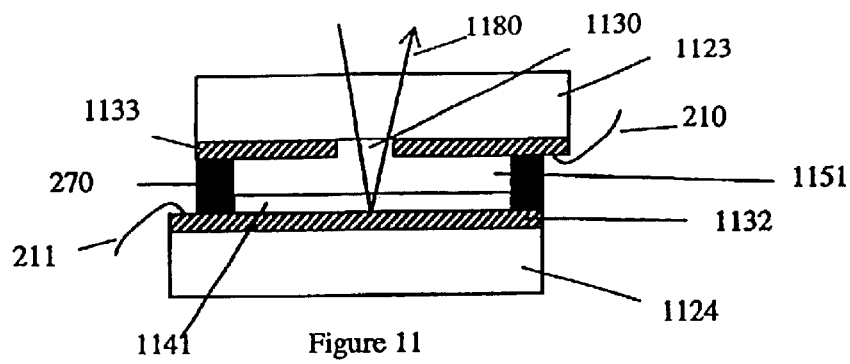
FIG. 11 shows a reflective EC attenuator with locally thinned conductor.

We also found that one may be able to eliminate the conductor or reduce its thickness locally from one of the electrodes. This area is from where the light enters and exits the device. FIG. 11 shows a reflective modulator based on these principles. Substrate 1124 is coated with a reflective conductor 1132 such as gold. This is further coated with an EC layer 1141, such as tungsten oxide. Another substrate 1123 is coated with a conductor 1133 such as gold or ITO. A hole 1130 is etched to remove the conductor. The device is assembled with the electrolyte 1151 and sealed with a sealant 270. The sealant to contain the interior ingredients and to protect from the environment is 270. The power is applied via the connectors 211 and 212. As shown in this figure the light beam 1180 enters the device through this hole 1130 and passes through the EC layer 1141 and is reflected from the conductor 1132 exits through the same hole. This light suffers very little insertion loss (i.e., substantially all the light enters the device) as there is no conductor on the top substrate for reflecting this beam. The insertion loss can be decreased by further ensuring that there are antireflective coatings or GRIN lens on the outside surface of 1123, and that the refractive index of the electrolyte is as close as possible to the substrate and the EC layer and the substrate 1123, preferably within ±0.4 or better. When the EC layer is colored the light beam is attenuated. The diameter of the hole 1130 (or its width if this is a slit) is dependent on the size of the beam and the average wavelength of light, but it should be preferably less than the thickness of the electrolyte 1151, more preferably less than one tenth of the thickness of the electrolyte. If one does not want to completely remove the conductor, it can be thinned in this area to at least reduce the input loss to less than half of the reflective loss caused by the conductor. The process of removal or thinning will be referred to collectively as thinning from a claims perspective.

Figure 12:
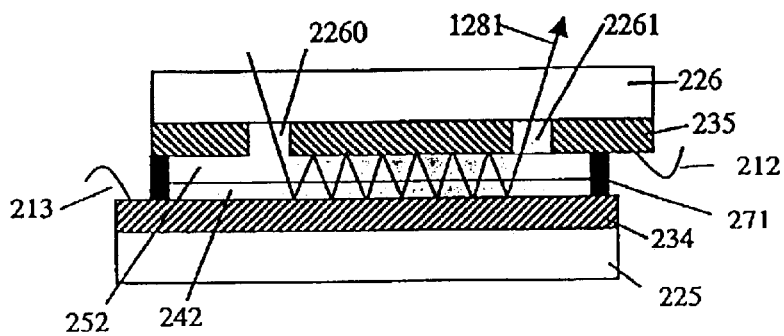
FIG. 12 shows a multiple reflective EC attenuator with locally thinned conductor.

Another device is shown in FIG. 12 where multiple reflections are used to attenuate the beam. This can result in higher beam attenuation. This can also be fast as the EC layer only has to be intercalated to a small degree, but larger attenuation is achieved due to multiple strikes. The device consists of similar components as described above, i.e., substrate 225 coated with conductor 234 and then EC layer 242, assembled with an electrolyte 252 to the other substrate 226 which has a conductive coating 235 and with two holes 2260 and 2261. This is sealed by a sealant 271. Power is applied via the terminals 213 and 212. The light beam 1281 enters the device through hole 2260 and passes through the EC layer several times due to multiple reflections and then exits through the hole 2261. For example when crystalline WO3 is used for the EC layer, it changes from transmissive to reflective in the infra-red region. Thus in FIG. 11 if the conductor below the tungsten oxide is transparent then the device will switch the beam from reflection to transmission, i.e., change the path of the light.

One could use the devices of this invention in the optical attenuator systems described in WO 99/55023. Further, one can also incorporate GRIN (Graded Index Optics) lenses on one or both sides of the EC device, depending whether it is a reflective device or a transmissive one. For example, such lenses and lens arrays with gradient optics are available from Nippon Sheet Glass (Osaka, Japan) under the name SEL-FOC. The high refractive index side of this lens could be used as one of the substrates for the EC device.

Figure 13:
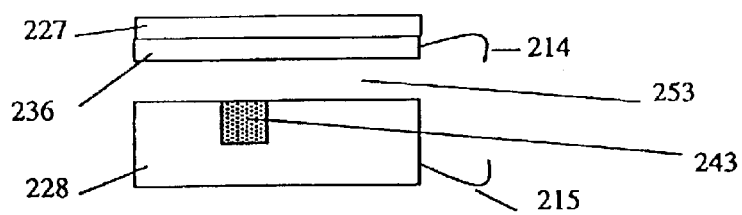
FIG. 13 shows a waveguide cross-section consisting of an EC material core.

FIG. 13 shows a buried waveguide (end view) in a silicon wafer 228. The waveguide 243 is a long channel, and a cross-section of this is shown. Light enters the waveguide end surface which is shown (going into the plane of the paper) and leaves at the other end (not shown). These ends may have anti-reflecting layers, GRIN or other lenses for reducing reflection losses and focussing. These may also function as seals to protect the waveguides from environmental ingress (typically oxygen and water). For lenses to protect these ends they must be bonded on to this area. Typically for single mode at 1550 nm the waveguide channel width and depth can be 1–10 microns. However these numbers can vary depending if it is a single or multimode. The EC device shown is based on the example of FIG. 1a. The silicon wafer could be "n" or "p" type so that it has some electronic conductivity. The channel in the silicon wafer 228 is filled by a higher refractive index EC material, such as a material consisting of tungsten oxide 243. This plate is separated by an electrolyte 253 (which may be a thin film, polymer or a liquid) from the other conductor 236 which is deposited on another substrate 227. One may cover the waveguide with a thin film of electrolytic layer (not shown) such as tantalum pentoxide or a lithium niobate which is lower in refractive index. The polymeric or liquid electrolyte 253 may still be used to complete the device as shown. Alternatively the device may be completed only using thin films where a thin film electrolyte is deposited (not shown) on 228 covering the waveguide 243, followed by a counterelectrode layer (not shown) and then followed by conductive layer such as ITO (not shown). Further layers for sealing, etc may also be deposited following the conductive layer. When a coloring voltage is applied as shown in the figure through the terminals 214 and 215, tungsten oxide colors reversibly. This results in both absorption and change in the refractive index. Both of these can cause a loss either due to increasing absorption or loss in light as it is not guided properly through the waveguide. There may also be a change in the index of the electrolyte along with the change in the EC material. This may also assist in signal control and attenuation.

Figure 14:
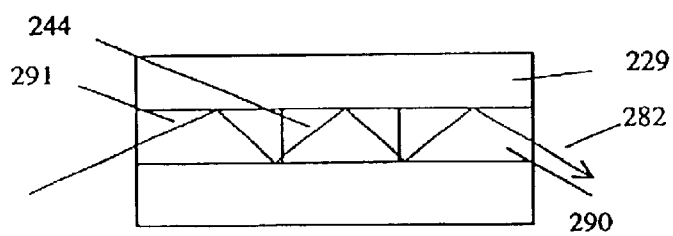
FIG. 14 shows a waveguide core consisting of a section of an EC material in the core.

As shown in FIG. 14 (top view of the waveguide) the EC material 244 may only be in a part of the waveguide formed by 291, 244 and 290 in a substrate 229 such as silicon wafer. The path of the light through the waveguide is shown by 282. The refractive index of 291, 292 and 244 (particularly in the bleached state) is lower than the substrate 229. 291 and 290 may be same or different materials which are not active from an electrochromic perspective. The refractive index of these should preferably match that of the EC layer in the bleached state so that the light losses at their interfaces can be minimized. These figures only demonstrate the principles, but one could embed an EC section in each arm of an arrayed waveguide (AWG) to give a versatile and independent control for each channel. The EC section may even be before splitting or after coupling, so that all wavelengths can be attenuated at the same time. One may use other substrate material other than silicon depending on the features, e.g., it can be erbium and /or ytterbium doped glasses where such waveguides are used for amplification of light by coupling optical pumps to these. Thus attenuation and amplification can happen in the same waveguide as desired by the user. As an extension a EC section can be put in the waveguide section attached to the pump but before it couples with the signal to be amplified so that amplification can be controlled.

Figure 15:
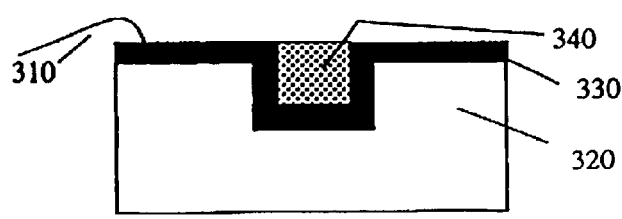
FIG. 15 shows a waveguide cross-section core consisting of EC material which can be colored in sections.

For a waveguide shown in FIG. 15, the electrical connection is applied via a transparent conductor 330 which is conformably deposited on the non-conductive substrate 320 (or the conductive silicon is first passivated with a transparent insulator (not shown) before the conductor is deposited). The channel is first coated with a lower refractive index (in relation to the EC material) but a conductive material, such as ITO. This is then filled with the EC material such as a material including tungsten oxide. This is done by physical vapor deposition, chemical vapor deposition or wet chemical methods. This is then planarized (polished) to remove the tungsten oxide from outside the channel. The ITO outside the channel is used as one electrode, and the rest of the device is made as in FIG. 13 discussed earlier.

Doping and changing its microporosity can tailor the refractive index of the EC layer. U.S. Pat. Nos. 5,457,218, 5,277,986 and 5,252,354 describe the materials used to make EC coatings, whereas the publication (Cronin, J. P., et.al., Solar Energy Materials and Solar cells, vol. 29 (1993), p. 271) describes some of the coatings formed by this process where their porosity was changed.

The complete EC device using the substrate in FIG. 15 is finished by sequential deposition of electrolyte film, conductive film and then a barrier or encapsulation layer such as silica. Since in all of the constructions in FIGS. 13 to 15 the electrolyte is in contact with the EC layer, this should also be lower in refractive index as compared to the EC material. One may provide the transparent conductor not in a continuous form but more as electrically non-commuting stripes which are parallel to one another and saddle the channel like a "U" shape and then conforming to the flat surface as shown in FIG. 15 to make electrical connections. If this is done it is preferable to coat the waveguide channel with a material which has the same refractive index as the transparent conductor (within ±0.05) so that when the transparent conductor and the EC material in the channel is deposited, the light only sees one refractive index in the cladding (i.e., the area surrounding the EC material within the waveguide channel). As an example one can make a mixed titanium dioxide and silicon dioxide coating to match the refractive index by varying the concentration of these constituents. When the EC device is finished, the top conductor can be continuous. All the stripes in the bottom conductor may be activated simultaneously or independently. When such stripes are all colored together, it will result in the EC channel coloring in roughly the same pattern as the striped conductor. This means the light travelling through it will encounter a grating which is varying in refractive index and absorption, or primarily in refractive index. This grating is reversible or user controllable. Thus, one can make at will gratings (e.g., Bragg gratings) which can be activated to impart specific functions known in the art, such as multiplexing, reflecting, etc. There are many variations to the theme, e.g., the device can be constructed using the theme of FIG. 1b where a counterelectrode is deposited on the second transparent conductor. The waveguide may not be embedded, but sticks out of the surface like a ridge (called ridge waveguide).

For the wavelength multiplexed system shown in WO 99/55023, it is preferred rather than individual elements, one physical element is used for all of the divided beams, but this physical unit is divided into individually addressable areas by etching lines on the conductive area. The EC elements can be located before multiplexers or after demultiplexers for tuning the intensity of individual beams, or between these if a constant amount of reduction is required for all the wavelengths. Examples of EC device fabrication with segmented areas and other features are described in WO 01/84230, which is incorporated in its entirety by reference herein.

As described in an earlier section one could use optical elements such as switchable gratings, lenses, or holographic patterns to provide functions that were not possible before. These patterns can be changed from one state to the other, or made to appear and disappear by coloring the patterned EC material. That is EC technology allows the fabrication of re-configurable optical elements.

For optical switches and waveguides where the beam path is changed a better method is to use the property of the change in the real part of the refractive index. Most electrochromic materials color by absorption, i.e., due to a large change in the imaginary part of the refractive index. Popular materials such as those containing tungsten oxide and molybdenum oxide generally color by the injection of protons and lithium ions. These ions are too small to cause large changes in the index. For this it is preferred to employ larger ions such as sodium, potassium, rubidium, cesium and silver. The structure of the electrochromic materials has to be more open to accept the larger ions, and some of the preferred for this are hexatungstates, Prussian blue, etc. Since the materials do not have to be electrochromic in the sense that they change color, but they should be able to reversibly switch from high to low index, materials with tunnel structures and large interstitial gaps would be suitable for this use. These materials may be also those containing vanadates and vanadium oxides. Also conductive polymers may show large change in refractive index. For materials which show a large change in index, only a small amount of ionic insertion will result in the desired change. This could lead to low switching voltages (lower than 1 volt) and fast kinetics.

Switches can be made where the cladding of fibers can be made electrochromic, so that a change in its refractive index will lead to dissipation of light rather than transmission. Same can be used in waveguides, where a change in index will lead to a change in the direction of light transmission. These could be planar waveguides and channel waveguides. Further, if the geometry and the properties are properly tailored one could couple and uncouple (split) and cause interference between adjacent channel guides (such as Mach Zehnder and Michaelson's interferometers). The EC material introduced in one of the arms of the interferometer can cause a phase change so that the light when combined will interfere destructively or constructively depending on the user requirements (user being referred to as also the control signal). As another example, waveguides may be combined with gratings which are electrochromic, however, the use of gratings is user selectable. Further, with EC since the properties can be changed continuously, one can select the extent or strength of these effects. All the elements described above made by EC materials which change significantly by absorption, can also be done by those materials which change significantly in their refractive index. This gives a designer an enormous freedom to make re-configurable optical components.

Application Area—Microwave Attenuation with EC and Thermochromic Devices

The electrochromic properties of several type of polymers can be used to make microwave shutter (windows) which can be controlled reversibly by a user or a controller (for example see "A microwave shutter using Conductive Polymers", T. L. Rose, et al, Synthetic Metals, Vol. 85 (1997), p 1439), the complete disclosure of which is included here by reference. The polymer changes reversibly from an insulating to a conductive state, which also changes its microwave attenuation properties (which can happen by changes in absorption and/or reflection). This can also be accomplished by other materials which change from an insulating to a metal like conductive state. For example, tungsten oxide and Poly EDOT (From Bayer, Leverkusen, Germany) can be reduced (intercalated) by protons, Li and sodium ions. When this happens, these materials go from an insulating to semi-conducting to a metal like state (e.g., see R. S. Crandall et. al. "Electronic Transport in Amorphous $H_xWO_3$," Physical Review Letters, Vol. 39 (1977) p. 232, for tungsten oxide). In this publication H is a proton, but for general discussion it can be replaced by lithium, sodium, etc. For example, in the tungsten oxide when it is intercalated by protons, $WO_3$ matrix becomes $H_xWO_3$ where "X" is the degree of intercalation. The transition from the semiconducting to conducting occurs when "X" is about 0.3. Thus if the microwaves are most attenuated by the metallic state, the device can be operated close to this limit i.e., x<0.3 to x>0.3, so that it only requires a small degree of intercalation so that the transition can be fast. Thus, for any matrix if the value of "X" is known, the range where the device should be operated for a fast response can be optimized.

In the above referenced paper by Rose, et. al., the device resembled FIG. 1b where polyaniline was used as a anodic EC electrode and manganese oxide was used as a passive ion-storage electrode. Use of tungsten oxide containing electrode (cathodic electrochromic) instead manganese oxide could have resulted in a better performing device as this would have added to the modulation of the device. Further in this paper, the speed of the 0.4 inch square device was low (about 10 minutes to switch from one state to the other) and cyclability was poor as the modulation of the device decreased very significantly after the first two cycles. Further, use of PTFE substrate in the device is not too appropriate as it limits materials which can be deposited at high temperature, adhesion issues are severe (with coatings and adhesives for sealant) and does not have a high barrier to both oxygen and water which limits the longevity of the device. Thus, to make practical devices these problems have to be overcome, where on this size of the device the speed should be less than 3 minutes, preferably less than 1 minute, most preferably less than one second; and cyclability should be high, at least 1000 times, more preferably greater than 10,000 times. This invention uses materials and devices as described in FIG. 1a and FIG. 1b, which show the desired characteristics listed above. Preferred substrates are those with good barrier properties and high transmissivity to the microwaves, some examples are glass, silicon, plastics coated with barrier layers such as silica, titania, etc.

These switches (attenuators or modulators or variable transmission windows) can be used in many areas where antenna function needs to be disabled or an antenna selection has to be made and thus some windows need to be closed down. Another area discussed earlier is of camouflage and jamming (or distorting) the signals which pass through. Thus the use of this can be in hand held devices such as cellular phones, mobile computers, microwave receiving antenna windows for buildings which may be communicating wirelessly with other buildings and satellites. Use in wireless modules with local and/or metro or other networks, e.g., blue tooth modules. The use of these can be in satellites, missiles, defense systems (such as equipment, transportation vehicles).

Also, thermochromic materials may also be used for this purpose, such as vanadium (IV) oxide ($VO_2$) which in its pure form changes from an insulator to metal at 68C. Composite materials which include the above materials at least as one of their components can also be used for this purpose. All throughout the present text, when materials are mentioned, e.g., tungsten oxide, then this will include dopants with other materials as well, such as oxides of other materials. Similarly, $VO_2$ may be doped with other oxides such as tungsten oxide to lower its transition temperature.

Windows using conductive polymers and the materials described above can be made on rigid (e.g., glass, GaAs, silicon wafers or plastics) or flexible substrates (thin glass, Si and plastics (thickness for rigid substrates such as glass and Si should be less than 100 microns)). Some of the preferred polymeric substrates are polyamide, polyimide, polyester and polycarbonate, however their barrier properties must be improved by e.g., additional coatings or incorporating fillers with barrier properties. Some example of the fillers are materials with flake like geometries such as mica, clay (Nanomer® from Nanocor, Arlington Heights, Ill.).

These devices may be discrete, inflexible or flexible. They may even have adhesive patches on one of their faces so that such devices could be pasted on products like tapes. These could be produced on rolls like tapes where the back sides (release layer) is peeled and then it is bonded.

Application Area—Microwave Attenuator with Thermochromic Device

This is a thin film heater which is deposited by a conductive film on a substrate. The film is etched to give an element of a heater as shown in the FIG. 16. The top view of the device only shows substrate along with a thin coating of the conductor 331 which is etched (removed) as shown by the dark areas 321. This results in a long serpentine path of the conductor from one end of the substrate to the other. The electric terminals 312 and 311 are attached to the conductive coating to apply the electric power to heat the device. The temperature of this may be regulated by a controller, an inline PTC (positive temperature coefficient) element or any other known means. The heater materials may be any conductive material such as chrome, copper, gold, stainless steel, etc. There may be other layers on top of this (not shown) to enhance the adhesion of the thermochromic material 341 which would be deposited on top of this to complete the device. Other protective layers may then be deposited. The side view shows the etched areas as channels in the heater coating 331. The thermochromic coating 341 is also shown. The heater is activated to reversibly increase the temperature of the thermochromic coating through its transition temperature so that its conductivity changes and it attenuates the microwaves above its transition temperature.

The distance between the etched areas in the heater film should be crafted to let the microwaves pass through when the vanadium oxide is below the transition temperature. When the heating is done than these areas should be narrow enough so that the heating of the thermochromic film is uniform even in the etched areas. One may even use alumina or sapphire substrates or additional underlying coatings to ensure that the thermal conductivity is high. Other variations of the theme include depositing a heater pattern on one side of a non-electrically conductive substrate (or bonding a heater element which has electrically non-conductive spaces between the heater elements), and depositing a thermochromic coating on the other side of the substrate, so that heating is done through the substrate. Heating elements and patterns are frequently used to heat up outside automotive mirrors and are available from ITW Chrono Therm (Elmhurst, Ill.).

Application Area—Microwave Attenuators with Electrochromic Device

FIG. 17 shows an electrochromic device for microwave attenuation. It shows an electrochromic device 300 which can be made as shown below in FIGS. 1a and 1b. The electrolyte for a device as shown in FIG. 1a consists of a salt, e.g., lithium triflate and a redox species such as ferrocene which are dissolved in a polar material such as propylene carbonate, sulfolane, etc. The electrolyte may have other ingredients such as PMMA for viscosity modification. With the above electrolyte a preferred EC layer is that containing tungsten oxide. If in the above electrolyte the ferrocene is replaced by viologen then preferably a polyaniline or polypyrrole coating can be used to replace the tungsten oxide (e.g., see U.S. Pat. No. 5,729,379 for highly reversible devices using polymeric electrodes with redox materials). The thickness of the TC (typically indium tin oxide and fluorine doped tin oxide) can be between 100 nm to 1000 nm. For the EC layer it can be between 100 nm to 5000 nm. The liquid or polymeric organic electrolyte the thickness can be 10 to 10,000 micrometers. The outside metallic aperture 380 (a hole in a conductive coating or a foil deposited or bonded to the EC device 300 ensures that the microwaves do not leak from the sides of the device 300. Alternatively, one may make EC window device with a counterelectrode can be made only on one substrate by depositing thin films sequentially of transparent conductor, EC layer, ion conductor, counter-electrode followed by another transparent conductor coating and typically followed by a sealing layer as well known in the art. In this case the major difference will be in the electrolyte layer (or ion conductor) which will by typically 100 to 1000 nm. Some examples of inorganic ion conductors amenable to thin film deposition are tantalum oxide, lithium-titanate, lithium-niobate, etc. Details of layer deposition and device assembly can be found in several of the earlier included references.

If the continuous transparent conductive coating (TC) is too attenuating then strips of conducting material, such as the TC or metals, e.g., gold can be used. In all the devices mentioned in connection with the present disclosure, whenever, a metal layer is used inside the device, it should be non-reactive to the components it comes in contact with, which are typically EC layer, electrolyte layer and counter-electrode. Typically, gold is quite non-reactive under most electrochemical conditions which the devices operate on, otherwise the metals have to be passivated as described earlier via a reference.

An example of a device with stripes of conductors is shown in FIG. 18a. Side view shows a device similar to FIG. 1a, where substrate 322 is coated with conductive stripes 332 (such as gold) and then an EC layer 342 (such as tungsten oxide) is deposited on this. This communicates via the electrolyte (or ion-conductor) 350 with the other substrate 323 which also has conductive metallic stripes 333. Power to the device is applied via the electrical leads 313 and 314. The stripes in the conductor are more clearly seen in section A—A (FIG. 18b). As shown, the stripes on both electrodes may be parallel or alternatively they may be rotated with respective to each other, and may not even be straight stripes. The spacing between the stripes may be closely related to the microwave being attenuated. For example, for a 30 GHz microwave, the wavelength is 0.01 cm. Thus the spacing may be smaller or larger than this to tune in the effects of diffraction. The strip pattern and spacing on the two substrates may also be different. One may deposit ion intercalative counter electrodes on the transparent conductor which is touching the electrolyte. These can be conductive polymers, such as polyaniline, vanadium oxide, etc which are well known in the literature. Typically when such counter-electrodes are used, then a redox material is not used in the electrolyte and one of the electrodes. When the device is powered to color a continuous sheet of conductive material, i.e., either the conductive electrodes or the conductive EC material, which reflects the microwaves. In the bleached state they pass through the non-conductive spaces between the inter-digited electrodes. The device discussed below also has similar operating principles.

Another way would be making this kind of structure as described in FIG. 19a where both electrodes are on the same surface. The electrodes are inter-digited 334 and 335 as shown in the top view along with the terminal connections 315 and 316 for powering. The dark areas is where the electrodes are located on the substrate. The front view in FIG. 19b taken through the section BB shows the complete device structure. The layer 390 is an insulating or an ion-conducting material such as silica, tantalum oxide, etc., this prevents a short between the electrodes 334 and 335 when the tungsten oxide colors. The tungsten oxide or the conductive polymer EC layer is shown as 343. The inter-digited electrodes are shown as 334 and 335. The electrolyte 351 can be a liquid or a polymer. This is sealed by using a sealant 371 and a cover plate 325. The fundamental guts of the device structure are similar to the one in FIG. 18, where the two electrode sets are on separate substrate and are connected by a liquid or polymeric electrolyte. The device can also be of the type shown in FIG. 1b, and in this case a counterelectrode layer will be incorporated the electrode 334, one may even eliminate the insulating layer 390 and substitute this with the counterelectrode.

These electrodes can be processed by standard semiconductor processing methods using photo-resists, masks, etching and deposition of sequential layers. The layers can be deposited by physical vapor deposition, chemical vapor deposition or by liquid (e.g., sol-gel, or solvent casting) techniques. An aperture can again be supplied on the outside of the window as discussed earlier. If a counterelectrode is used it can be provided on the tip of that set of inter-digited electrode which is in contact with the electrolyte. The layer thicknesses are described above, but the insulating silica or the tantala layer can be 10 to 1000 nm thick. In this device when the EC layer is non-conductive, the microwaves can pass through the inter-digited electrodes, however, when the EC layer is colored, there is no normal path for the microwaves to pass through as it sees a continuous conductive layer. The overlap between the EC layer on the insulating layer should be sufficient so that it covers the inter-digited electrode below (or leaves a small enough space which are not penetrated by the microwaves).

Attenuation (including reflection) of the microwaves or RF radiation in 1 to 100 GHz, is also dependent on the type of substrate which is chosen. A TC coating can be put on this substrate which has just enough sheet resistance so that the EC device can work, but it will have only a small impact on the RF attenuation (as measured by shielding). Since the wavelength of RF radiation from 1 GHz to 100 GHz can vary between 0.003 to 0.3 m, one could use the substrate thickness as well to design the right RF response. One may make integrated devices where different parts of the device attenuate (control) different type of electromagnetic radiation, such as optical and microwaves, or the same part may control both. As an example the devices in FIGS. 13 to 16 can control both. For example in FIG. 13, thermochromic property of $VO_2$ effects the transmission in the IR as well as its conductivity changes, In FIG. 16, use of material containing tungsten oxide will also attenuate visible, and IR radiation while changing its conductivity which is useful for modulating the microwaves.

The above discussion has generally described discrete EC or thermochromic elements. However, it will be apparent to those skilled in the art that it is also possible to integrate these elements on the same substrates where the other components are located. This results in "integrated optical modules". Such integrated modules may have solid state laser emitters (vertical cavity lasers), wave guides, multiplexers, demultiplexers, amplifiers, switches and signal conditioners on a single substrate. EC materials may be used in several of these such as in waveguides, signal conditioners, switches, multiplexers and demultiplexers. Further and other modifications will be apparent and may be implemented by those skilled in the art without, however, departing from the spirit and scope of our invention.

What is claimed is:

1. An electrochromic device having an electrochromic layer including an electrochromic coating and a counterelectrode, wherein the electrochromic coating includes tungsten oxide and at least one dopant selected from the group consisting of an alkali metal oxide and transition metal oxides, the alkali metal oxide dopant being lithium oxide, sodium oxide or potassium oxide, and wherein the counterelectrode comprises vanadium oxide doped with at least one dopant selected from the group consisting of tin oxide and antimony oxide.

2. An electrochromic device according to claim 1 wherein the transition metal oxide dopant is vanadium oxide, molybdenum oxide, cobalt oxide, chromium oxide or copper oxide.

3. An electrochromic device according to claim 1 wherein the electrochromic coating has an atomic ratio of vanadium and molybdenum to tungsten in the range of 0.03 to 0.4 and an atomic ratio of molybdenum to vanadium in the range of 0.2 to 2.

4. An electrochromic device having an electrochromic layer comprising a patterned tungsten oxide coating and having a patterned, planar substrate.

5. A device according to claim 4 wherein at least in one state of coloration the pattern on the coating and the pattern on the substrate interfere to provide Moiré fringes.

6. A device according to claim 4 or 5 wherein the pattern on the coating is selected from the group of patterns consisting of concentric circles, wavy lines, circular dots of non-uniform size, spots, straight lines and straight lines converging toward center.

7. A device according to claim 4 or 5 wherein the pattern on the coating and the pattern on the substrate are selected from the group of patterns consisting of concentric circles, wavy lines, circular dots of non-uniform size, spots, straight lines and straight lines converging toward center.

8. A lens, prism, optical or photographic filter comprising the device of claim 4 or 5.

9. A microscope, gunsight, telescope, binocular, endoscope, periscope, theodilite or microwave attenuation device including the device of claim 4 or 5.

10. An electrochromic device comprising a lens having two piano-convex substrates having faces disposed in opposing relation to each other and being coated with a transparent conducting material, an electrochromic layer coating the inside face of at least one of the substrates, an electrolyte layer containing an electrolyte disposed between the substrates and a seal for sealing the lens.

11. An electrochromic lens device comprising two concave substrates having faces disposed in opposing relation to each other and being coated with a layer of transparent conductor material, an electrochromic layer coating at least one of the layers of transparent conductor material, an electrolyte layer containing an electrolyte and being disposed between the electrochromic layer and the layer of transparent conductor material, and a seal for sealing the lens.

12. A reflective modulator device comprising a first substrate having a planar face coated with a reflective coating layer and an electrochromic layer coating the reflective coating layer, a second substrate having a planar face disposed in opposing relation to the electrochromic layer of the first substrate and being coated with a conductive coating layer, the conductive coating layer having at least one aperture with a dimension less than the thickness of the electrolyte layer, an electrolyte layer containing an electrolyte and being disposed between the electrochromic layer coating the first substrate and the conductive coating layer coating the second substrate, and a seal for sealing the device.

13. A reflective modulator device according to claim 12 wherein the at least one aperture is a single hole, a single slit or a multiplicity of holes.

14. An electrochromic device comprising two planar substrates having inside faces disposed in opposing relation to each other, an electrode layer comprising two parallel stripes disposed along the edges of one of the inside faces and having a plurality of interdigitated fingers, an electrochromic layer coating the electrode layer, an insulating layer between the electrode layer and the electrochromic layer, and an electrolyte layer containing electrolyte disposed between the electrochromic layer and the inside face of the opposed substrate.

* * * * *

UNITED STATES PATENT AND TRADEMARK OFFICE
CERTIFICATE OF CORRECTION

PATENT NO.      : 6,906,842 B2
APPLICATION NO. : 10/276409
DATED           : June 14, 2005
INVENTOR(S)     : Anoop Agrawal et al.

It is certified that error appears in the above-identified patent and that said Letters Patent is hereby corrected as shown below:

Column 1,
Line 28, insert -- , -- after "devices".

Column 2,
Line 31, delete "a" after "about".

Column 3,
Line 42, delete "." after "titanate".

Column 4,
Line 9, delete "are" after -- Some of these --.

Column 5,
Line 33, "periscopes,--camera" should read -- periscopes, camera --.

Column 6,
Line 3, "respectively cm" should read -- respectively on --.
Line 40, "Longniont" should read -- longmont --.
Line 63, "and or" should read -- and/or --.

Column 7,
Line 1, "patters" should read -- patterns --.
Line 47, "is" should read -- it is --.

Column 9,
Line 43, "pattern" should read -- patterns --.

Column 10,
Line 12, "tensing" should read -- lensing --.

UNITED STATES PATENT AND TRADEMARK OFFICE
CERTIFICATE OF CORRECTION

PATENT NO. : 6,906,842 B2
APPLICATION NO. : 10/276409
DATED : June 14, 2005
INVENTOR(S) : Anoop Agrawal et al.

It is certified that error appears in the above-identified patent and that said Letters Patent is hereby corrected as shown below:

Column 11,
Line 31, "rather then" should read -- rather than --.

Column 13,
Line 37, "11°C" should read -- 10°C --.

Column 27,
Line 8, "which will by" should read -- which will be --.

Column 29,
Line 37, "piano-convex" should read -- plano-convex --.

Signed and Sealed this

Twentieth Day of June, 2006

JON W. DUDAS
*Director of the United States Patent and Trademark Office*